(12) United States Patent
Hsiao et al.

(10) Patent No.: US 8,179,634 B2
(45) Date of Patent: May 15, 2012

(54) PERPENDICULAR MAGNETIC RECORDING WRITER MAIN POLE HAVING IMBEDDED NON-MAGNETIC CORE AND DE-COUPLED POLE TIP

(75) Inventors: Wen-Chien David Hsiao, San Jose, CA (US); Ming Jiang, San Jose, CA (US); Changqing Shi, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1173 days.

(21) Appl. No.: 12/005,786

(22) Filed: Dec. 27, 2007

(65) Prior Publication Data

US 2009/0168237 A1    Jul. 2, 2009

(51) Int. Cl.
*G11B 5/127* (2006.01)
(52) U.S. Cl. .................................... 360/125.1
(58) Field of Classification Search ........... 360/125.1, 360/123.01, 123.1, 125.31, 125.14, 125.74, 360/125.3, 125.06, 110
See application file for complete search history.

(56) References Cited

U.S. PATENT DOCUMENTS

| | | | |
|---|---|---|---|
| 5,486,967 A | 1/1996 | Tanaka et al. | |
| 6,687,085 B2 | 2/2004 | Minor et al. | |
| 6,771,464 B2 | 8/2004 | Minor | |
| 6,952,325 B2 * | 10/2005 | Sato et al. | 360/125.08 |
| 7,369,359 B2 * | 5/2008 | Fujita et al. | 360/125.33 |
| 7,535,675 B2 * | 5/2009 | Kimura et al. | 360/125.09 |
| 7,549,213 B2 * | 6/2009 | Hsu et al. | 29/603.12 |
| 7,558,020 B2 * | 7/2009 | Sasaki et al. | 360/125.14 |
| 7,710,685 B2 * | 5/2010 | Kimura et al. | 360/125.09 |
| 7,859,791 B2 * | 12/2010 | Toma et al. | 360/125.07 |
| 7,944,646 B2 * | 5/2011 | Mochizuki et al. | 360/125.1 |

(Continued)

FOREIGN PATENT DOCUMENTS

JP          60059517          4/1985

(Continued)

OTHER PUBLICATIONS

Bia et al, Detached Pole Tip Design of Perpendicular Write Heads for High Data Rate Recording, IEEE Trans on Magnetics, Sep. 2002, 2240-42, vol. 38, No. 5.

(Continued)

*Primary Examiner* — Allen Cao
(74) *Attorney, Agent, or Firm* — D'Arcy H. Lorimer; Lorimer Labs

(57) ABSTRACT

Methods and structures for the fabrication of a thin film, perpendicular recording write head are disclosed. The structure provides a pole tip separated from a rear pole by a non-magnetic separation layer located adjacent the flare point. The rear pole contains an imbedded non-magnetic layer. The separated pole tip and imbedded layer aid in the high data rate recording as well as the erasure performance of the write pole structure. The fabrication involves the deposition of two different oxide layers which have mutually high etch selectivities. This characteristic allows a write pole structure to be built wherein the track width is independent of the location of the flare point. The process also produces a structure wherein the placement of the throat height of the shield is self aligned to the flare point of the write pole.

6 Claims, 26 Drawing Sheets

U.S. PATENT DOCUMENTS

| | | | |
|---|---|---|---|
| 8,031,434 B2 * | 10/2011 | Le et al. | 360/125.1 |
| 2005/0162778 A1 | 7/2005 | Kimura et al. | |
| 2005/0280939 A1 | 12/2005 | Sasaki et al. | |
| 2006/0002021 A1 | 1/2006 | Li et al. | |
| 2006/0092567 A1 | 5/2006 | Guan | |
| 2006/0103980 A1 | 5/2006 | Sasaki et al. | |
| 2006/0119981 A1 | 6/2006 | Li et al. | |
| 2006/0139802 A1 | 6/2006 | Sasaki et al. | |
| 2006/0276039 A1 | 12/2006 | Li et al. | |
| 2007/0014048 A1 | 1/2007 | Sasaki et al. | |

FOREIGN PATENT DOCUMENTS

| | | |
|---|---|---|
| JP | 3132909 | 6/1991 |
| JP | 7201988 | 8/1995 |
| JP | 2003317212 | 11/2003 |

OTHER PUBLICATIONS

Bia et al, Stiched pole tip design with enhanced head field for perpendicular recording, Journal of Applied Phys, May 13, 2002, 6540-42, vol. 93, No. 10.

* cited by examiner

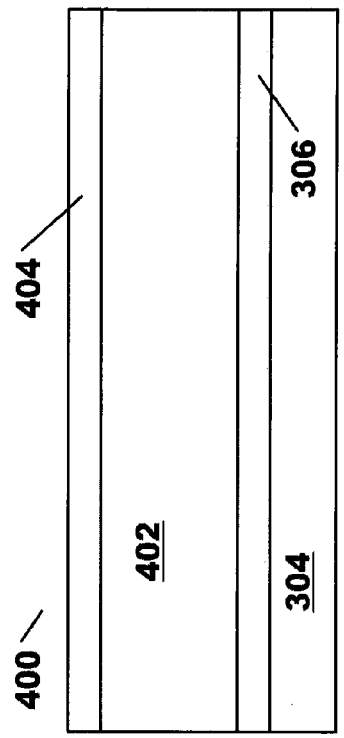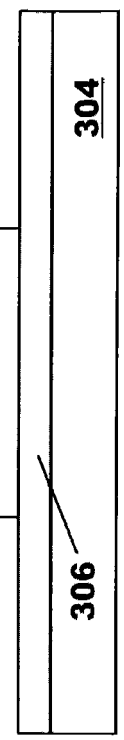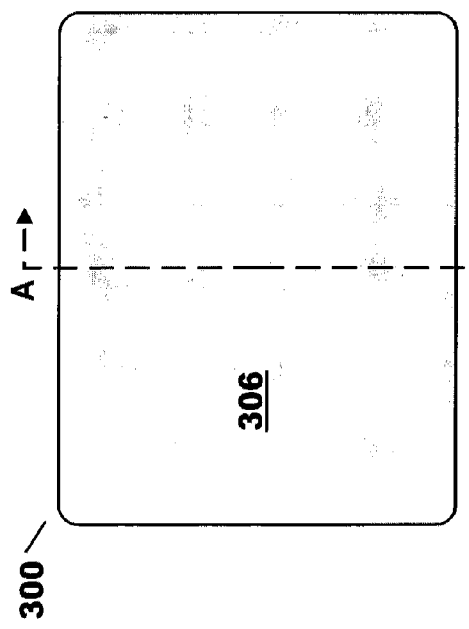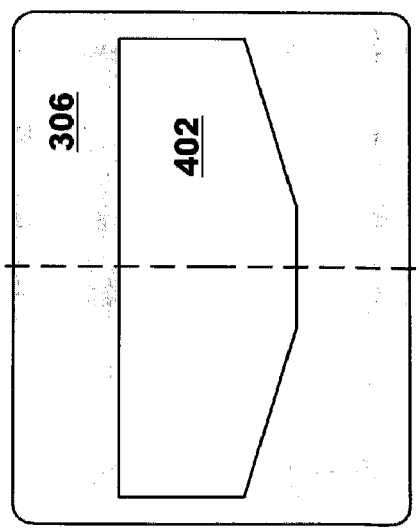

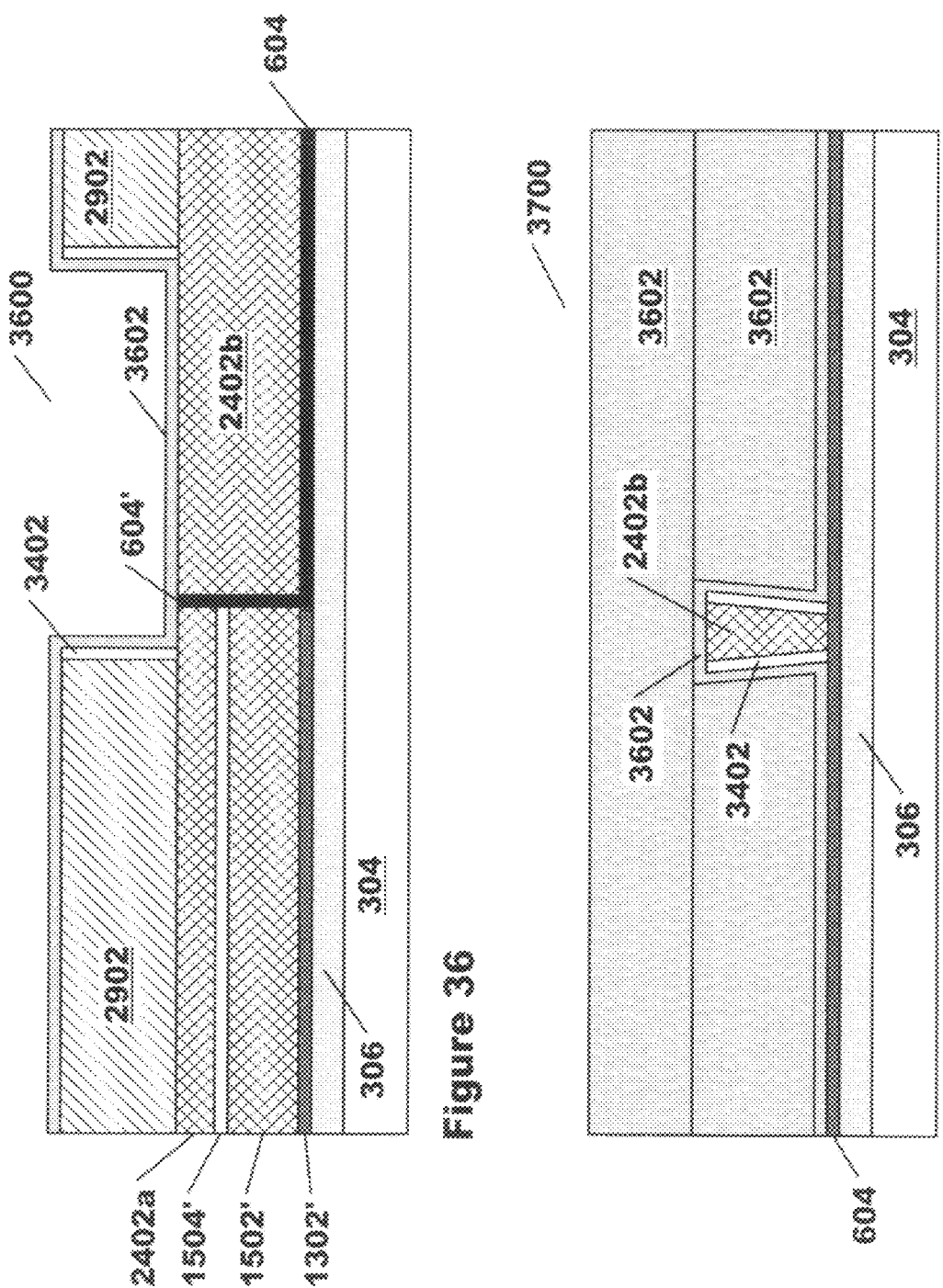

PERPENDICULAR MAGNETIC RECORDING WRITER MAIN POLE HAVING IMBEDDED NON-MAGNETIC CORE AND DE-COUPLED POLE TIP

BACKGROUND OF THE INVENTION

1. Field of the Invention

This invention relates to structures and methods for fabricating thin film magnetic write heads. More specifically, the invention relates to structures and methods for fabricating a thin film write head for perpendicular recording having independent control of track width, flare point, wrap around shield throat height self aligned to flare point, and stepped wrap around shields wherein the thickness or depth of the wrap around shield increases in the back region the write main pole. The methods and structure also provide for a back pole region having an imbedded non-magnetic layer and a separation layer between back pole and front pole regions to form de-coupled pole tip.

2. Description of the Related Art

As areal densities for magnetic storage hard disk drives continue to increase, the critical dimensions for thin film write heads are driven to smaller levels. For future designs, track widths (TW), flare points (FP), and wrap around shield throat heights (TH) will be on the order of 60 nm. Holding these dimensions provides a significant challenge for conventional processing, as will be illustrated in FIG. 1. FIG. 1 (Prior Art) is a partial plan view 100 of a typical thin film perpendicular write pole 212. Write pole 212 is typically imbedded in oxide layer 112, and is deposited after imaging the shape of the pole and etching oxide layer 112. Alternatively, write pole layer 212 can be blanket deposited, then imaged to define the final shape, etched or ion milled to define the pole, with areas around the pole subsequently filled with an oxide layer and both layers planarized. In either case, current imaging and etching processes can create errors with respect to the location of the flare point 102, since the position where the flare point is located by lithography $FP_d$ ref 104 will not be the actual location of the flare point $FP_a$ ref 106 subsequent to etching/milling of the pole material 212, or oxide layer within which the pole material is deposited. Errors can also be introduced with respect to the track width TW. The imaged track width $TW_d$ ref 108 may be larger or smaller than the actual value $TW_a$ ref 110. These errors also impact the location of the flare point. As dimensions are reduced, the location errors of the flare point can significantly impact the performance of the write head. Similar errors are introduced when locating and etching the cavities for the wrap around shield. The throat height, or the depth or thickness of the wrap around shield from the ABS, is critical to the performance of the write head. More particularly, the location of the rear of the wrap around shield relative to the flare point is critical, and is subject to significant errors when conventional lithography and etching processes are utilized to fabricate the shield. What is needed is a better process for producing perpendicular thin film write heads.

FIG. 2 (Prior Art) is a partial, cross sectional view of a typical thin film perpendicular write head 200. The head comprises shield layers 202, 204, shaping layer 210, coil structure 208, main pole 212, lower return pole layer 206, wrap around shield 214, and upper return pole layer 216. Alternatively, structure 214 may also be a trailing shield. Main pole 212 is typically deposited over spacer layer 112. Details of wrap around shields and trailing shields, as applied to perpendicular recording heads, can be found in, for example, US Patent Application Publications 2007/0146930, 2007/0115584, 2006/0174474, 2006/0044682, and 2007/0137027.

SUMMARY OF THE INVENTION

It is an object of the present invention to provide a thin film perpendicular magnetic head including a write pole having a first flare point, a second flare point, and a separation layer, the write pole having a first portion extending from an air bearing surface to the separation layer, the first portion having a constant first width, the write pole having a second portion extending from the first flare point to the second flare point, the second portion having a constant second width greater than the first width, the separation layer dividing the first portion from the second portion.

It is another object of the present invention to provide a method for making a thin film perpendicular magnetic head including depositing a first oxide layer, a separation layer, and a second oxide layer on a surface, a portion of the separation layer interposed between the first oxide layer and said second oxide layer, the portion of the separation layer oriented approximately perpendicular to the surface; depositing a mask layer over a first portion of the first oxide layer and over a first portion of the second oxide layer; creating an opening in the mask layer, the opening exposing a second portion of the first oxide layer and a second portion of the second oxide layer, the opening extending across the portion of the separation layer; isotropically etching, with a first process, the second portion of the first oxide layer to form a first trench; and, anisotropically etching, with a second process, the second portion of the second oxide layer, subsequent to isotropically etching the first oxide layer with the first process, to form a second trench, wherein the second portion of the second oxide layer is exposed to conditions of the first process, and the width of the first trench is greater than the width of the second trench.

BRIEF DESCRIPTION OF THE DRAWINGS

The present invention will be better understood when consideration is given to the following detailed description thereof. Such description makes reference to the annexed drawings, wherein:

FIG. 3a is a partial plan view of a substrate subsequent to the deposition of a blanket etch stop layer in accordance with an embodiment of the present invention;

FIG. 3b is a cross section view through section A-A of FIG. 3a in accordance with an embodiment of the present invention;

FIG. 4 is a cross section view of FIG. 3b subsequent to the deposition of a blanket layer of oxide 1 and a metal mask layer in accordance with an embodiment of the present invention;

FIG. 5a is a plan view of FIG. 4 subsequent to the etching of oxide 1 in accordance with an embodiment of the present invention;

FIG. 5b is cross section view through section B-B of FIG. 5a in accordance with an embodiment of the present invention;

FIG. 36 is a cross section view of FIG. 34b subsequent to the deposition of a shield gap layer in accordance with an embodiment of the present invention;

FIG. 37 is a cross section view of FIG. 35b subsequent to the deposition of al shield gap layer in accordance with an embodiment of the present invention;

DETAILED DESCRIPTION OF THE PREFERRED EMBODIMENTS

Figure 1:
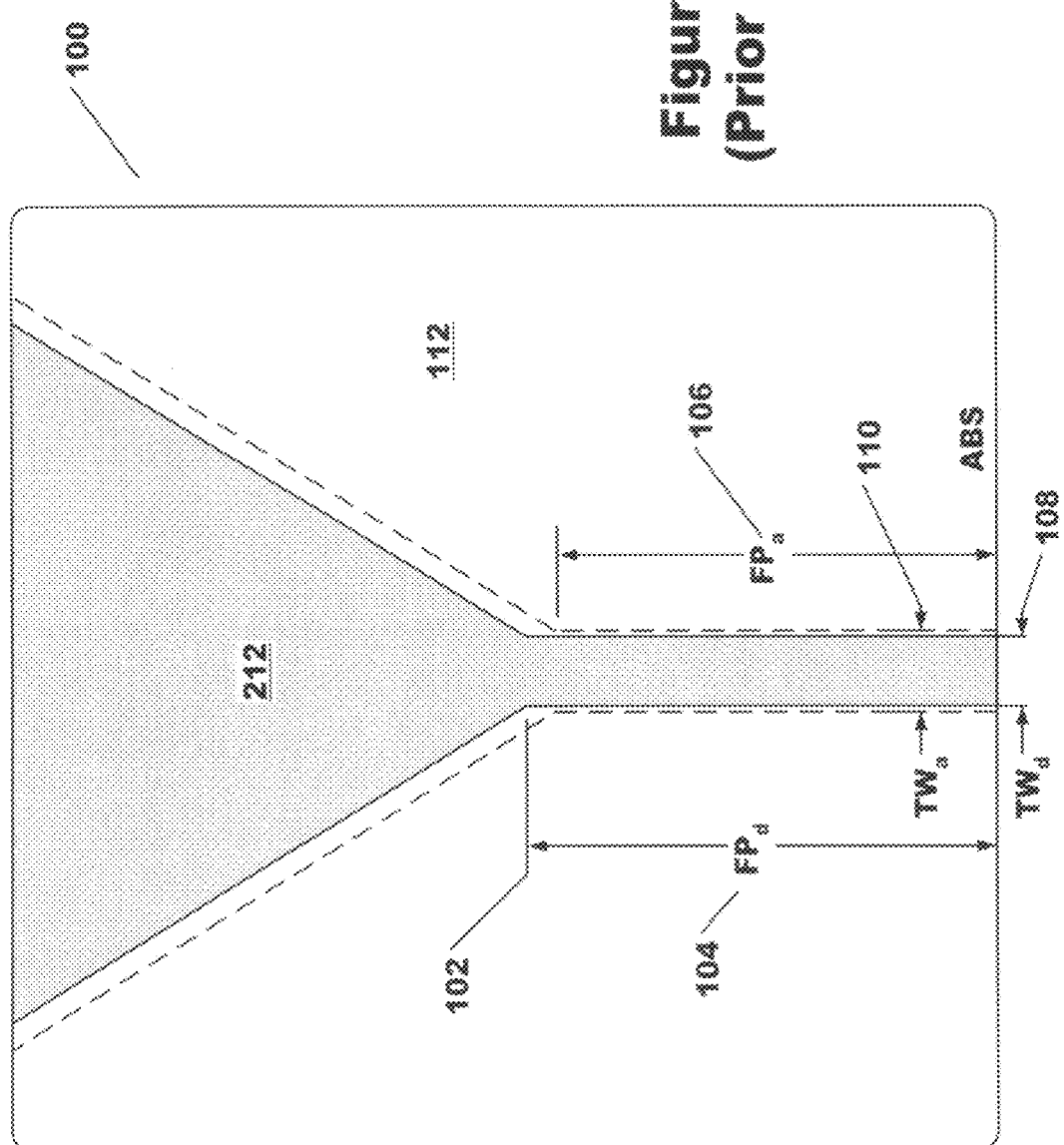
FIG. 1 (Prior Art) is a partial plan view of a typical thin film perpendicular write pole.
Figure 2:
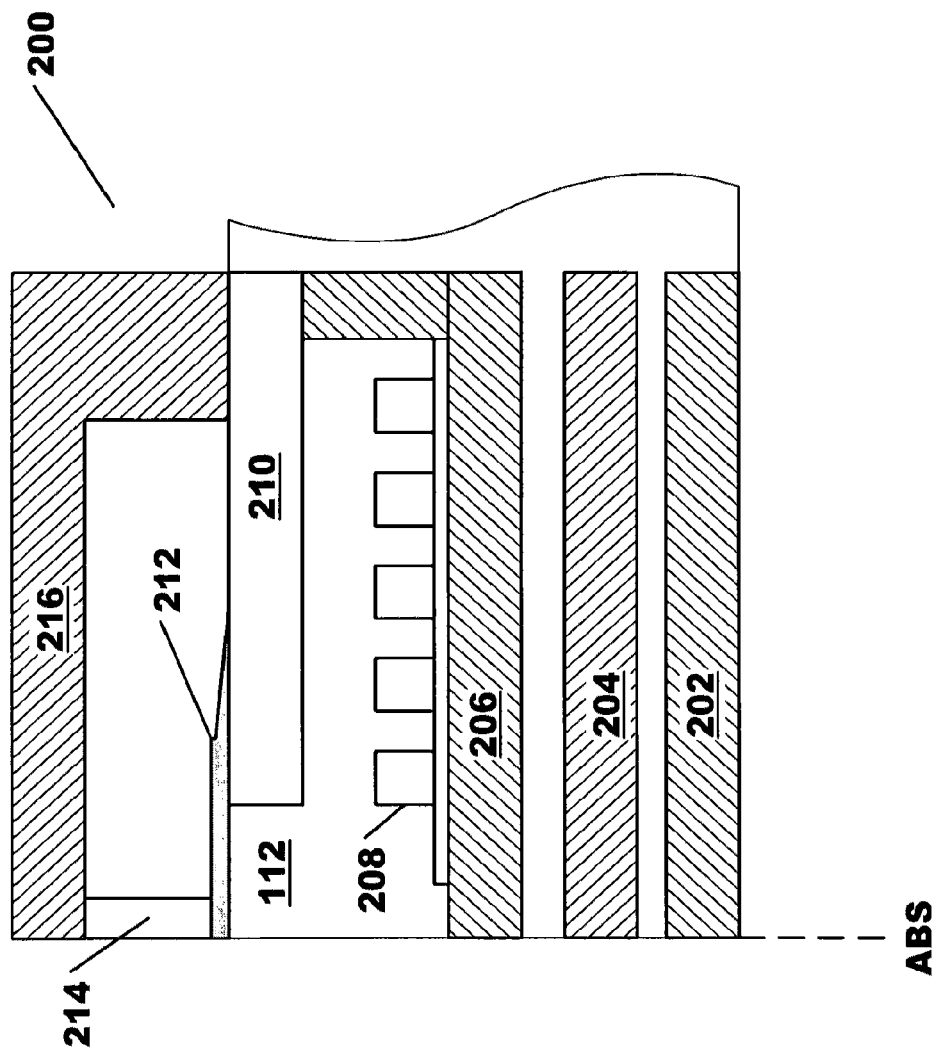
FIG. 2 (Prior Art) is a partial cross section view of a typical thin film perpendicular write head structure.

FIGS. 1 and 2 (Prior Art) have been discussed above in the Background section. Details of the embodiments of the present invention are best described via a sequential process of construction disclosed in FIGS. 3-41 below.

FIG. 3a is a partial plan view 300 of a substrate subsequent to the deposition of a blanket etch stop layer 306 in accordance with an embodiment of the present invention. FIG. 3b is a cross section view 301 through section A-A of FIG. 3a. Support layer 304 is typically a spacer layer comprising a dielectric material similar to layer 112 of FIG. 2 (Prior Art). Etch stop layer 306 may comprise a metal or dielectric, preferably layer 306 is a metal. Typically, etch stop layer 306 may comprise a metal such as Ru, Rh, or Cr, but other materials may be suitable as are well known to those skilled in the art.

FIG. 4 is a cross section view 400 of FIG. 3b subsequent to the deposition of a blanket layer of oxide 1 (ref 402) and a metal mask layer 404 in accordance with an embodiment of the present invention. Material composition of oxide 1 layer 402 is disclosed in detail below. Subsequent to the deposition of mask layer 404, a photo resist layer is deposited, imaged, and developed in accordance with processes well known to those skilled in the art (not shown). Portions of mask layer 404 is then etched in accordance with the pattern developed in the photo resist (not shown). After patterning mask layer 404, portions of oxide 1 layer 402 are removed by RIE in accordance with processes known in the art.

FIG. 5a is a plan view 500 of FIG. 4 subsequent to the etching of portions of oxide 1 layer 402 in accordance with an embodiment of the present invention. FIG. 5b is cross section view 501 through section B-B of FIG. 5a. Following the etching of oxide 1 layer 402, metal mask layer 404 and portions of etch stop layer 306 not covered by remaining portions of oxide 1 layer 402 are removed by processes well known in the art.

Figure 6:
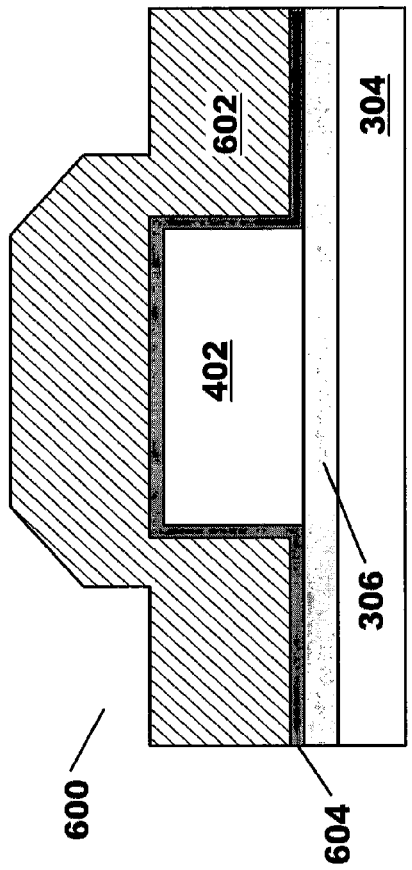
FIG. 6 is a cross section view of FIG. 5b subsequent to the blanket deposition of oxide 2 in accordance with an embodiment of the present invention.

FIG. 6 is a cross section view 600 of FIG. 5b subsequent to the blanket deposition of oxide 2 layer 602 and separation layer 604 in accordance with an embodiment of the present invention. Separation layer 604 preferably comprises (but is not limited to) a metal such as Pt, Pd, Rh, Ru, Cr, their mixtures and alloys. Oxide 1 and oxide 2 are chosen to have unique selectivities when undergoing a reactive ion etch (RIE) processing. That is, when oxide 1 is being etched, oxide 2 is minimally affected. Likewise, when oxide 2 is being etched, oxide 1 is minimally affected. Some examples of oxide 1/oxide 2 pairs include, but are not limited to:

I. Oxide 2:$SiO_2$; Oxide 1:$Si_3N_4$
II. Oxide 2:$SiO_2$; Oxide 1:$Al_2O_3$

For pair I, SiO2 etching is performed with carbon rich fluorocarbon gases such as $C_3F_8$ and $C_4F_8$. $Si_3N_4$ etching is performed with mixtures of $CF_4/O_2/N_2$, or $SF_6/CH_4/N_2/O_2$. When etching $SiO_2$ in the presence of $Si_3N_4$, selectivities range from 4:1 up to 30:1. When etching $Si_3N_4$ in the presence of $SiO_2$, selectivity is about 6:1. For pair II, $SiO_2$ etching is performed with mixtures of $CHF_3/CF_4$ with a $SiO_2/Al_2O_3$ selectivity of about 10:1. $Al_2O_3$ etching is performed in $BCl_3$ with a $Al_2O_3/SiO_2$ selectivity of about 10:1.

In an alternate embodiment of the present invention, pair I can be Oxide 1:$SiO_2$; Oxide 2:$Si_3N_4$. Pair 2 can be Oxide 1:$SiO_2$; Oxide 2:$Al_2O_3$. The foregoing limitations on the etch chemistries and selectivities apply.

Figure 7A:
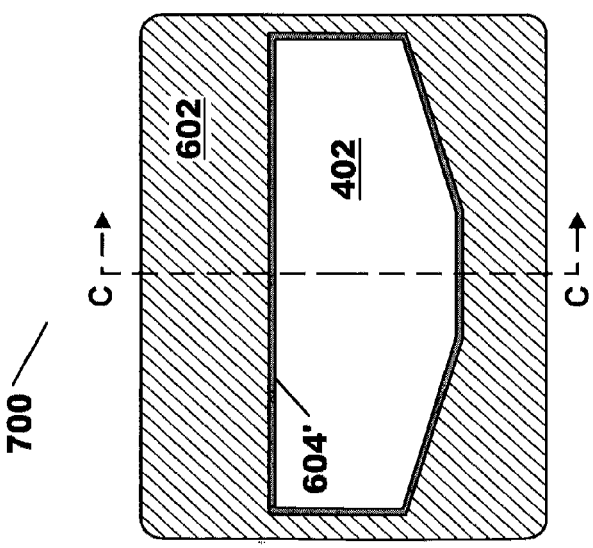
FIG. 7a is a plan view of FIG. 6 subsequent to the planarization of oxide 2 in accordance with an embodiment of the present invention.
Figure 7B:
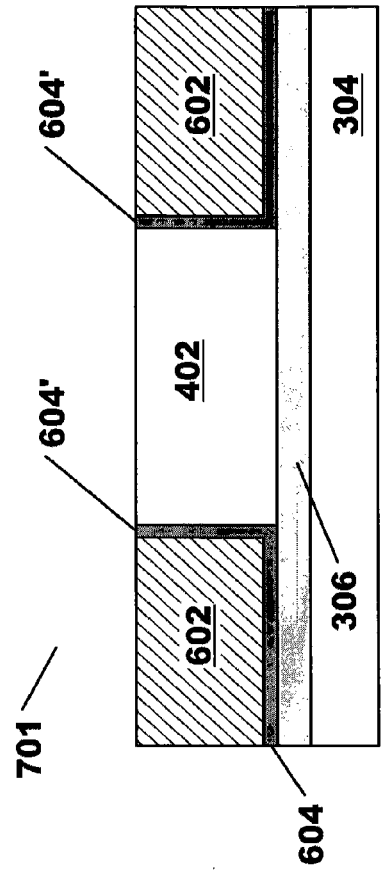
FIG. 7b is a cross section view through section C-C of FIG. 7a in accordance with an embodiment of the present invention.

FIG. 7a is a plan view 700 of FIG. 6 subsequent to the planarization of oxide 2 layer 602 and removal of a portion of layer 604 in accordance with an embodiment of the present invention. FIG. 7b is a cross section view 701 through section C-C of FIG. 7a. Layer 604' represents the portion of separation layer 604 that provides a boundary between oxide 1 layer 402 and oxide 2 layer 602.

Figure 8:
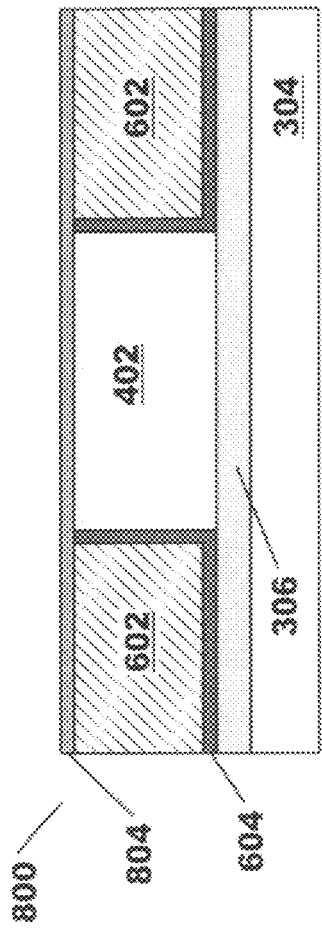
FIG. 8 is a cross section view of FIG. 7b subsequent to the blanket deposition of an etch mask layer and a CMP stop layer in accordance with an embodiment of the present invention.

FIG. 8 is a cross section view 800 of FIG. 7b subsequent to the blanket deposition of an etch mask layer and CMP stop layer 804 in accordance with an embodiment of the present invention. Layer 804 performs a dual function and acts a both a mask and CMP stop layer. Layer 804 is preferably comprised of a precious metal such as Pd, Pt, Ru, Rh, and Cr, but other materials may be suitable as are known in the art.

Figure 9A:
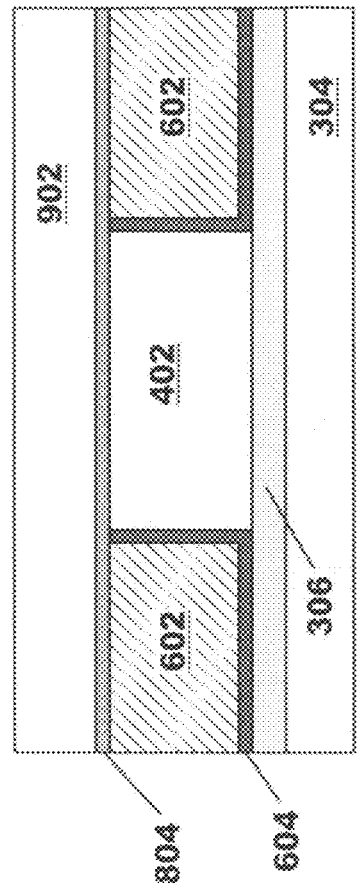
FIG. 9a is a cross section view of FIG. 8 subsequent to the blanket deposition of a photo resist layer in accordance with an embodiment of the present invention.
Figure 9B:
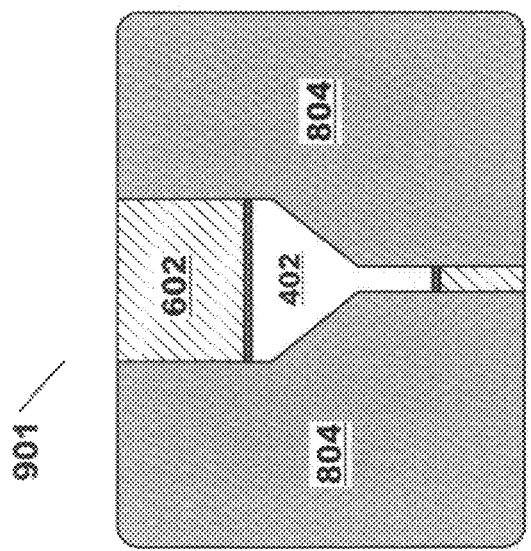
FIG. 9b is a plan view of FIG. 9a subsequent to the patterning of mask and CMP stop layer 804 in accordance with an embodiment of the present invention.

FIG. 9a is a cross section view 900 of FIG. 8 subsequent to the blanket deposition of a photo resist layer 902 in accordance with an embodiment of the present invention. After imaging and developing photo resist layer 902, mask and CMP stop layer 804 are patterned to removed a portion of layer 804. Photo resist layer 902 is then stripped (not shown). FIG. 9b is a plan view 901 of FIG. 9a subsequent to the patterning of mask and CMP stop layer 804 in accordance with an embodiment of the present invention. Portions of oxide 1 layer 402 and oxide 2 layer 602 are now exposed for further processing.

Figure 10:
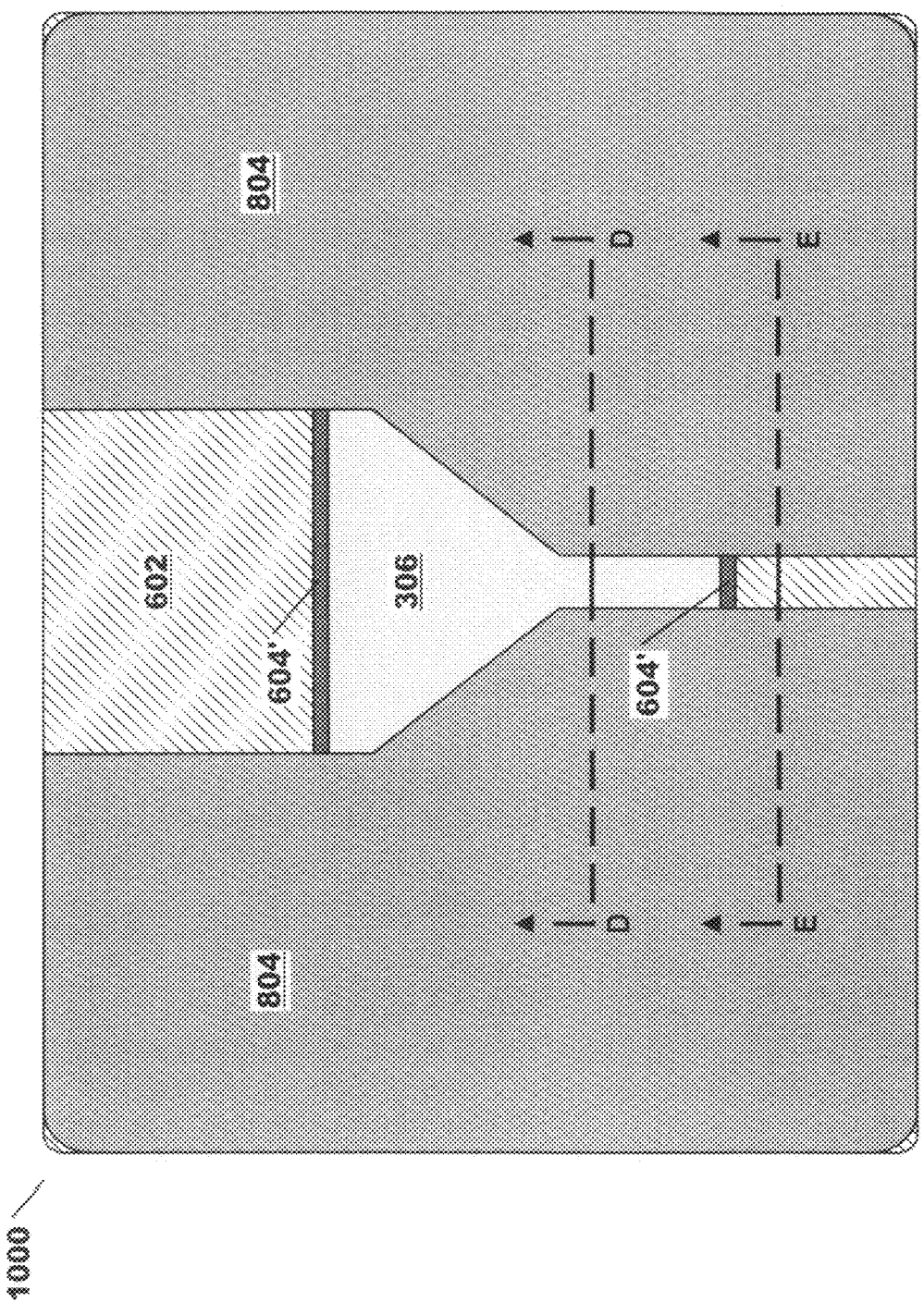
FIG. 10 is a plan view of FIG. 9b subsequent to the selective isotropic etching of oxide 1 in accordance with an embodiment of the present invention.

FIG. 10 is a plan view 1000 of FIG. 9b subsequent to the selective isotropic etching of a portion of oxide 1 layer 402 in accordance with an embodiment of the present invention. Due to the selection of oxide 1 and oxide 2, combined with the aforementioned etch conditions, oxide 2 is minimally affected during the etch of oxide 1. After removal of the exposed portion of oxide 1 layer 402, a portion of underlying layer 306 is exposed.

Figure 11:
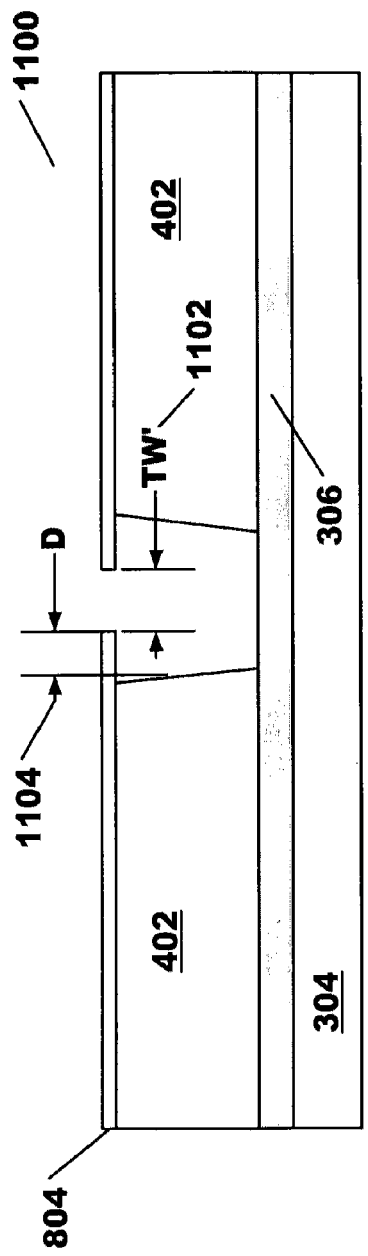
FIG. 11 is a cross section view through section D-D of FIG. 10 in accordance with an embodiment of the present invention.
Figure 12:
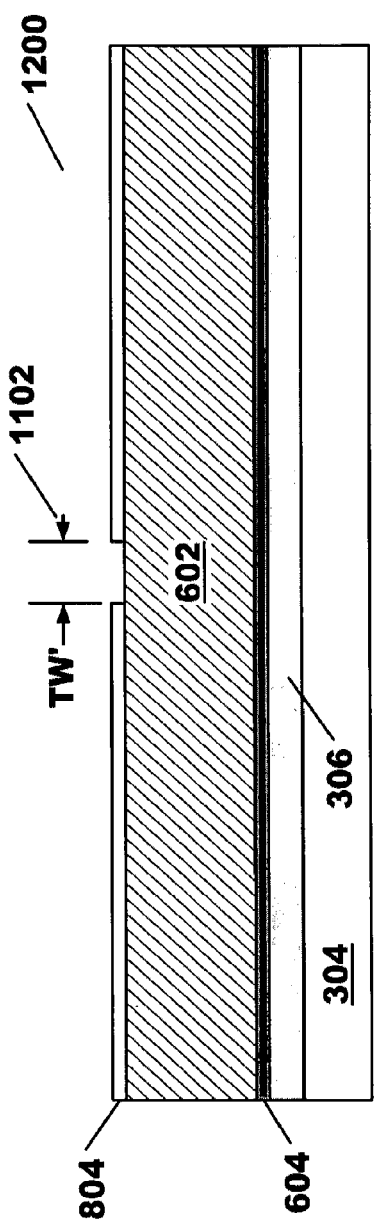
FIG. 12 is a cross section view through section E-E of FIG. 10 in accordance with an embodiment of the present invention.

FIG. 11 is a cross section view 1100 through section D-D of FIG. 10 in accordance with an embodiment of the present invention. FIG. 12 is a cross section view 1200 through section E-E of FIG. 10. Isotropic etching of oxide 1 layer 402 has undercut the oxide near the mask opening TW' (ref 1102) by a distance D (ref 1104). This undercutting during isotropic etching creates a self aligned flare point (see FIG. 28 below) at the boundary of separation layer 604'. Typically, distance D is about 50% of mask opening TW', but can be as large as 100% of TW'. The opening TW' in mask and CMP stop layer 804 situated over oxide 2 layer 602 will later define the track width of the write pole.

Figure 13:
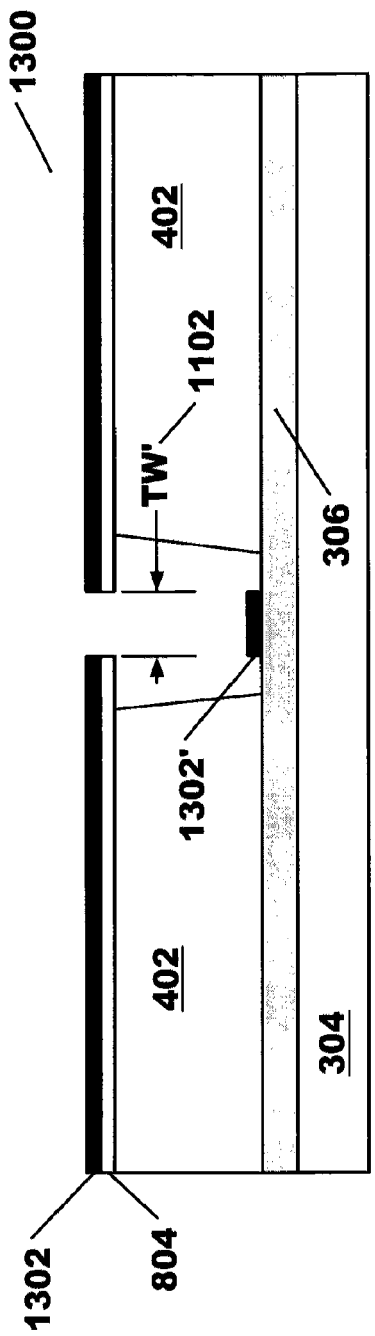
FIG. 13 is a cross section view of FIG. 11 subsequent to the deposition of a spacer layer in accordance with an embodiment of the present invention.
Figure 14:
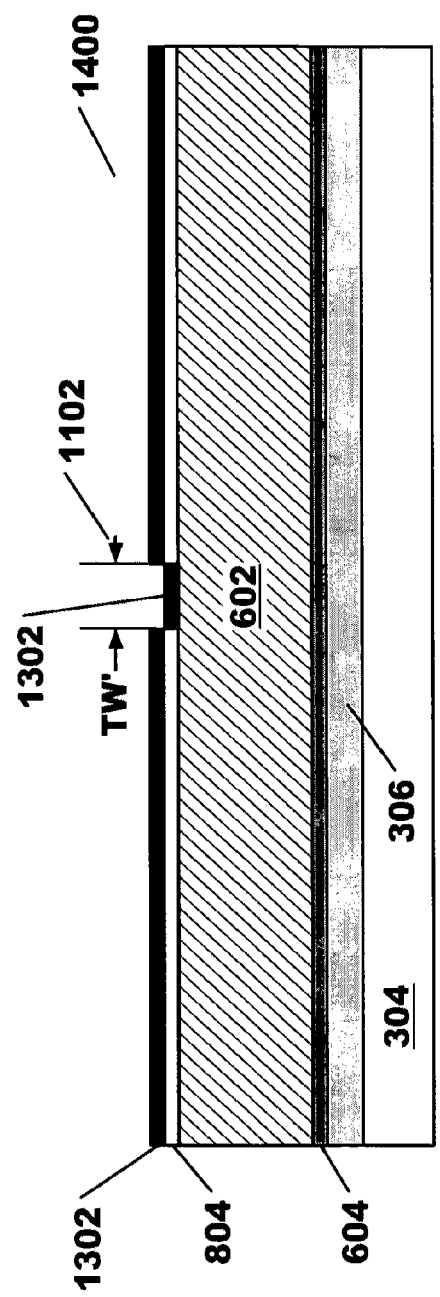
FIG. 14 is a cross section view of FIG. 12 subsequent to the deposition of a spacer layer in accordance with an embodiment of the present invention.

FIG. 13 is a cross section view 1300 of FIG. 11 subsequent to the deposition of spacer layer 1302 in accordance with an embodiment of the present invention. FIG. 14 is a cross section view 1400 of FIG. 12 subsequent to the deposition of a spacer layer 1302. Spacer layer 1302 is deposited to fill in opening TW' to protect the mask opening over oxide 2 layer 602 from damage or unintended dimensional change during a subsequent CMP planarization step (FIG. 14). Preferably, the deposition is carried out with a "line of sight" type deposition process such as sputtering or vapor deposition, the conditions of which are well known to those skilled in the art. Layer 1302 comprises a reactive ion etchable material such as aluminum oxide. The deposition process also deposits layer 1302' in the trench previously etched in oxide 1 layer 402 of FIG. 12.

Figure 15:
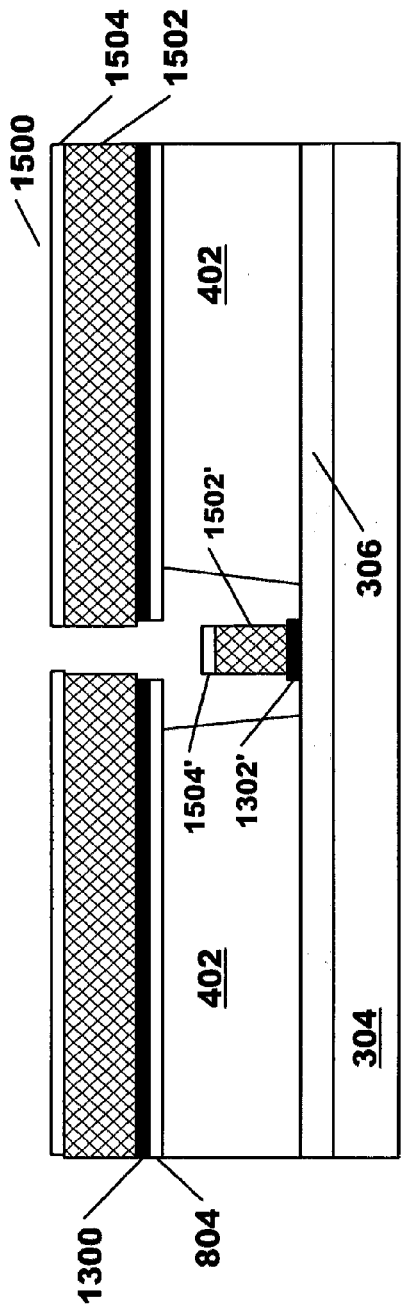
FIG. 15 is a cross section view of FIG. 13 subsequent to the deposition of magnetic layer 1502 and non-magnetic core layer 1504 in accordance with an embodiment of the present invention.
Figure 16:
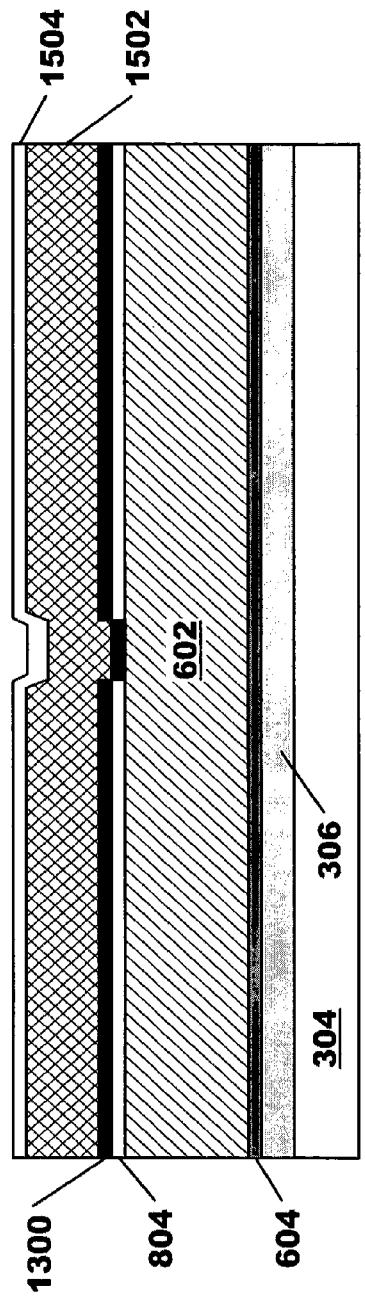
FIG. 16 is a cross section view of FIG. 14 subsequent to the deposition of magnetic layer 1502 and non-magnetic core layer 1504 in accordance with an embodiment of the present invention.

FIG. 15 is a cross section view 1500 of FIG. 13 subsequent to the deposition of magnetic layer 1502 and non-magnetic core layer 1504 in accordance with an embodiment of the present invention. Both layers 1502 and 1504 are deposited with "line of sight" type deposition processes such as sputtering. Deposition produces magnetic layer 1502' and non-magnetic core layer 1504' situated within the trench previously etched in oxide 1 layer 402. The thickness of magnetic layer 1502' is utilized to position the horizontal location (as viewed in FIG. 15) of the non-magnetic core layer 1504'. Magnetic layers 1502, 1502' comprise magnetic alloys of Fe, Ni, and Cr, as are well known to those skilled in the art. Non-magnetic core layer 1504, 1504' may be any non-magnetic material, oxide or metal. Preferably, layer 1504, 1504' comprises a precious metal such as Rh, Ru, Pt, Pd; or an oxide such as alumina or silica. FIG. 16 is a cross section view 1600 of FIG. 14 subsequent to the deposition of magnetic layer 1502 and non-magnetic core layer 1504.

Figure 17:
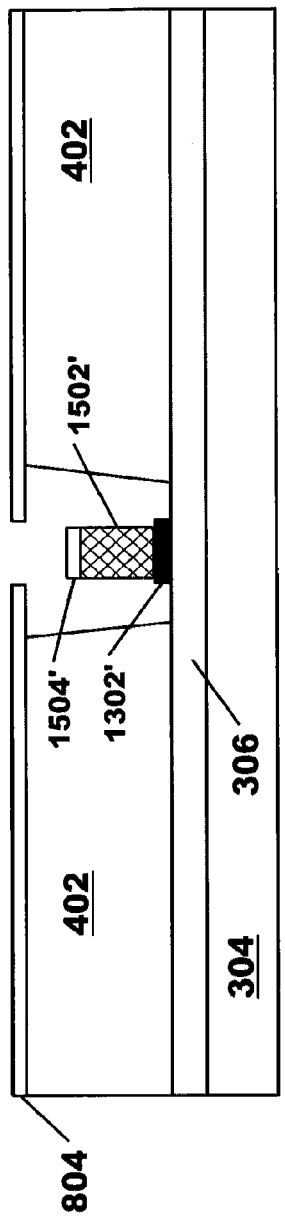
FIG. 17 is a cross section view of FIG. 15 subsequent to planarization in accordance with an embodiment of the present invention.
Figure 18:
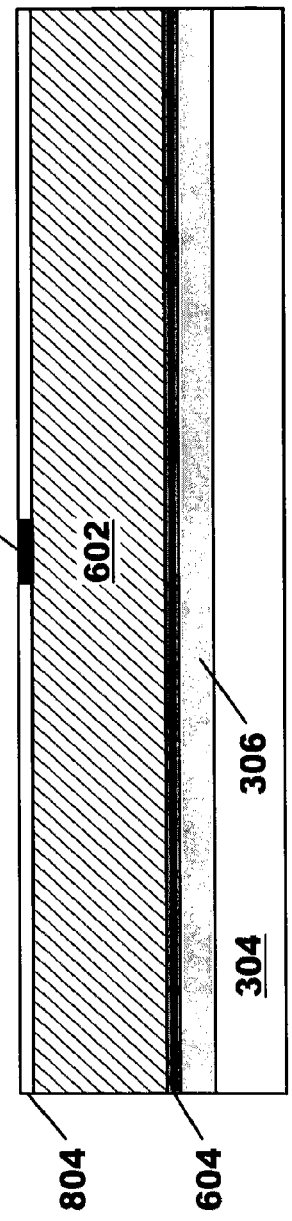
FIG. 18 is a cross section view of FIG. 16 subsequent to planarization in accordance with an embodiment of the present invention.

FIG. 17 is a cross section view 1700 of FIG. 15 subsequent to planarization in accordance with an embodiment of the present invention. Layers 1300, 1502, and 1504 have been removed by CMP, to stop layer 804. FIG. 18 is a cross section view 1800 of FIG. 16 subsequent to planarization in accordance with an embodiment of the present invention. Note a portion of layer 1302 remains to protect the pole defining opening in layer 804. An optional process (not shown) may be utilized to protect the open trench in FIG. 17 from debris created during the CMP process. This process requires filling of the trench with proto resist after the processes completed in FIG. 15, and prior to the planarization by CMP. The entire trench need not be filled completely, only the opening defined by layer 804. After planarization, the protective photo resist is removed by standard dry photo resist stripping processes.

Figure 19:
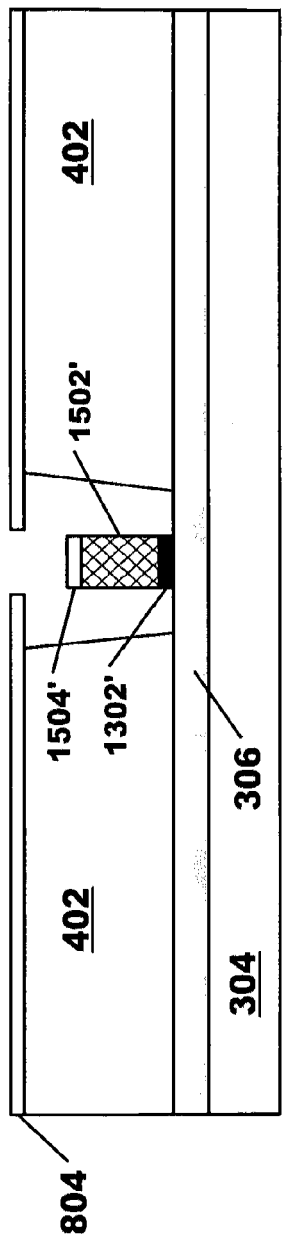
FIG. 19 is a cross section view of FIG. 17 subsequent to removal of spacer layer 1302 in accordance with an embodiment of the present invention.
Figure 20:
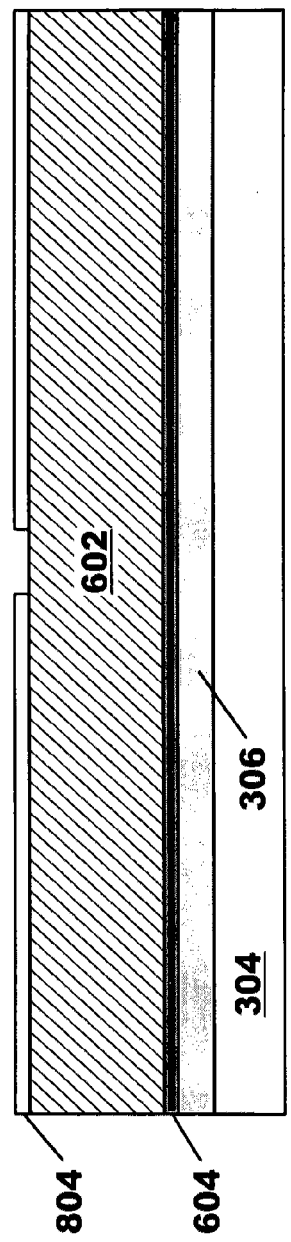
FIG. 20 is a cross section view of FIG. 18 subsequent to removal of spacer layer 1302 in accordance with an embodiment of the present invention.

FIG. 19 is a cross section view 1900 of FIG. 17 subsequent to removal of spacer layer 1302 in accordance with an embodiment of the present invention. FIG. 20 is a cross section view 2000 of FIG. 18 subsequent to removal of spacer layer 1302. Layer 1302 is removed by RIE in accordance with processes well known to those skilled ion the art.

Figure 21:
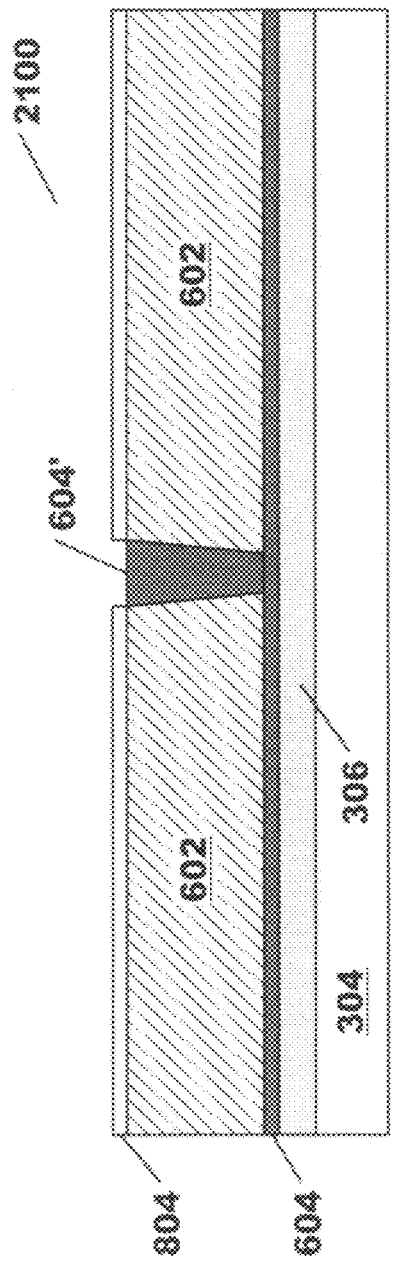
FIG. 21 is a cross section view of FIG. 19 subsequent to the an-isotropic etching of oxide 2 in accordance with an embodiment of the present invention.

FIG. 21 is a cross section view 2100 of FIG. 19 subsequent to the an-isotropic etching of oxide 2 layer 602 in accordance with an embodiment of the present invention. Note that a portion of separation layer 604' is visible due to removal of a portion of oxide layer 602. The cavity is not filled with layer 604'.

Figure 22:
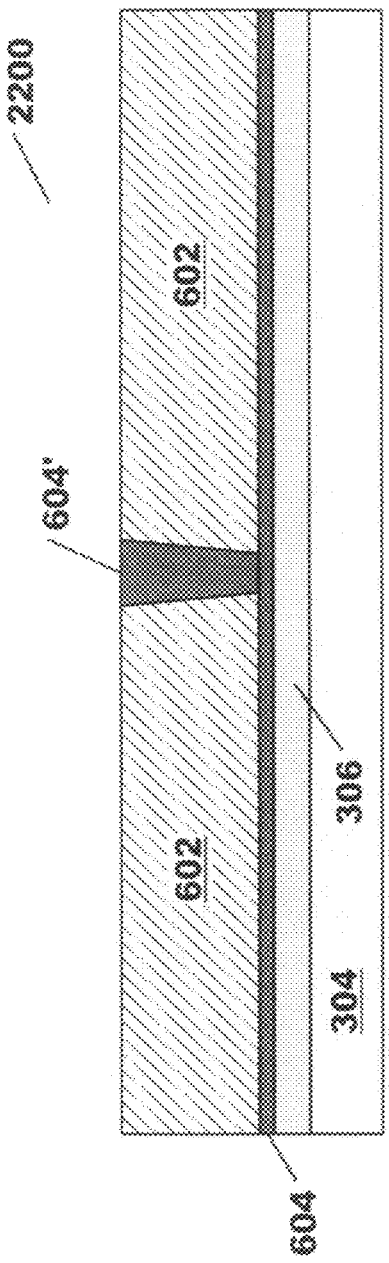
FIG. 22 is a cross section view of FIG. 21 subsequent to the removal of CMP stop layer 804 in accordance with an embodiment of the present invention.

FIG. 22 is a cross section view 2200 of FIG. 21 subsequent to the removal of CMP stop layer 804 in accordance with an embodiment of the present invention.

Figure 23:
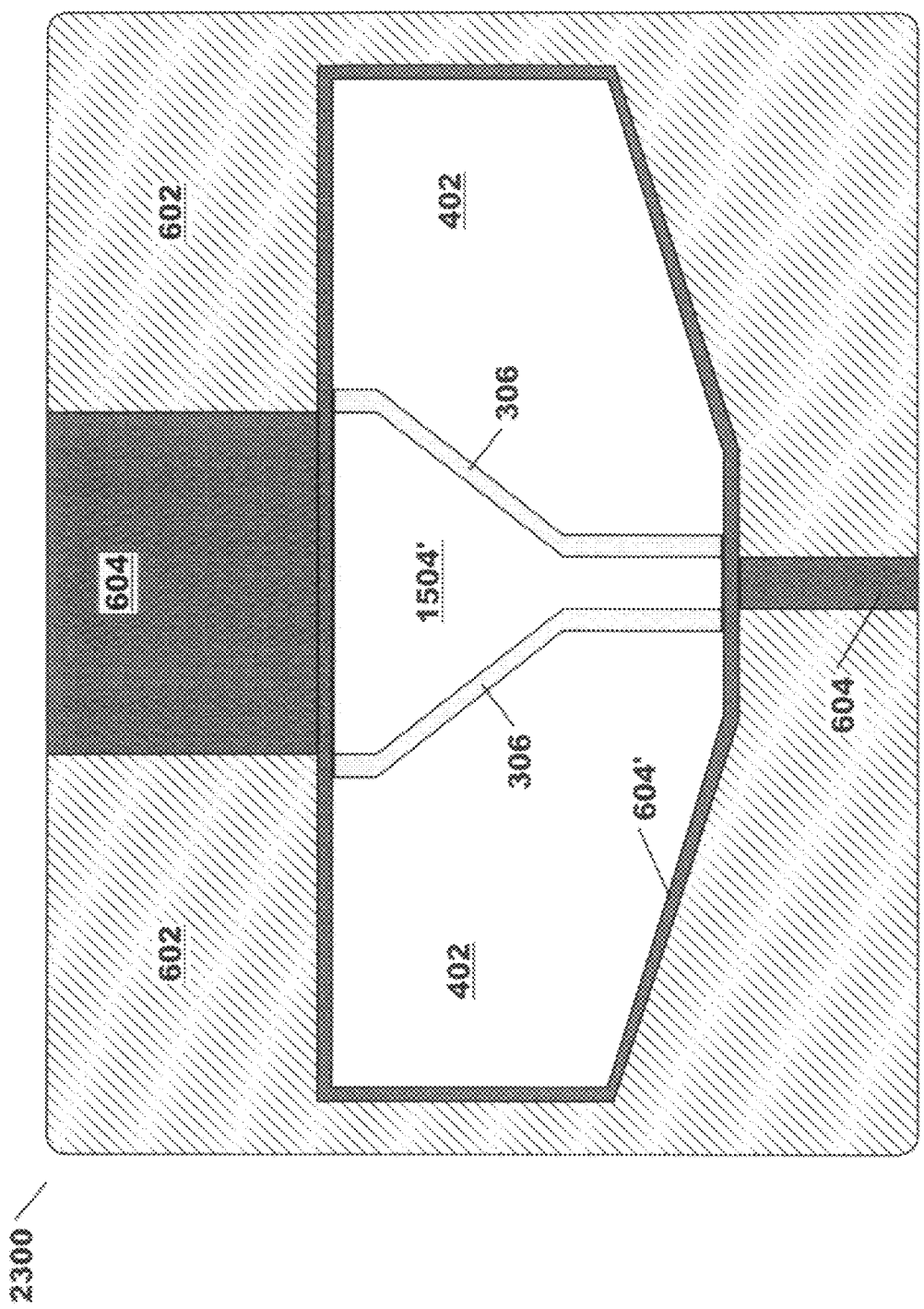
FIG. 23 is a plan view of the structure in FIG. 22 in accordance with an embodiment of the present invention.

FIG. 23 is a plan view 2300 of the structure in FIG. 22 in accordance with an embodiment of the present invention. Non-magnetic core layer 1504' extends up to separation layer 604'.

Figure 24:
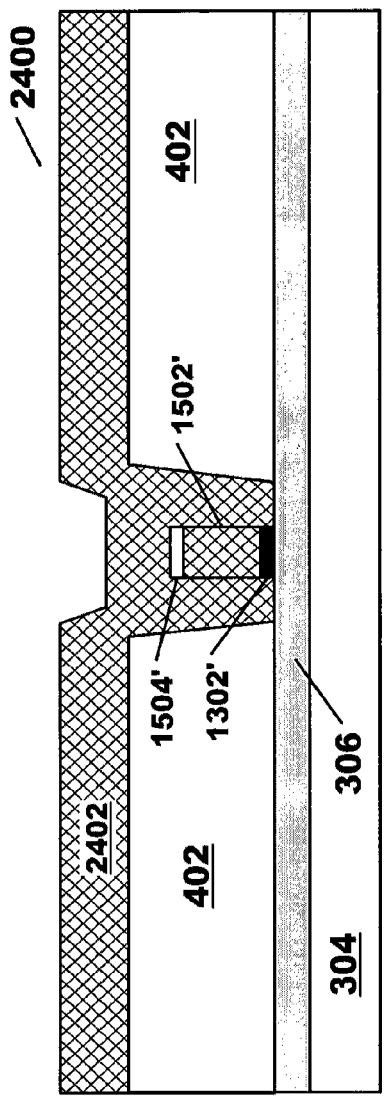
FIG. 24 is a cross section view of FIG. 19 subsequent to the deposition of magnetic material 2402 in accordance with an embodiment of the present invention.
Figure 25:
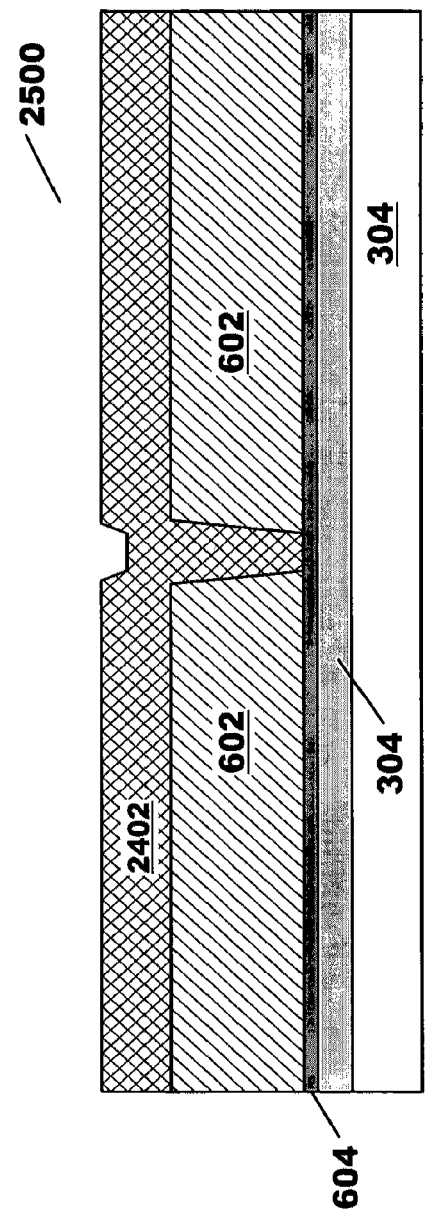
FIG. 25 is a cross section view of FIG. 22 subsequent to the deposition of magnetic material 2402 in accordance with an embodiment of the present invention.

FIG. 24 is a cross section view 2400 of FIG. 19 subsequent to the deposition of magnetic material 2402 in accordance with an embodiment of the present invention. Magnetic layer 2402 may be deposited by sputtering or vapor deposition. Layer 2402 may also be deposited by electroplating following the deposition of a conformal magnetic seed layer (not shown). Magnetic layer 2402 is composed of the same material as layer 1502'. FIG. 25 is a cross section view 2500 of FIG. 22 subsequent to the deposition of magnetic material 2402.

Figure 26:
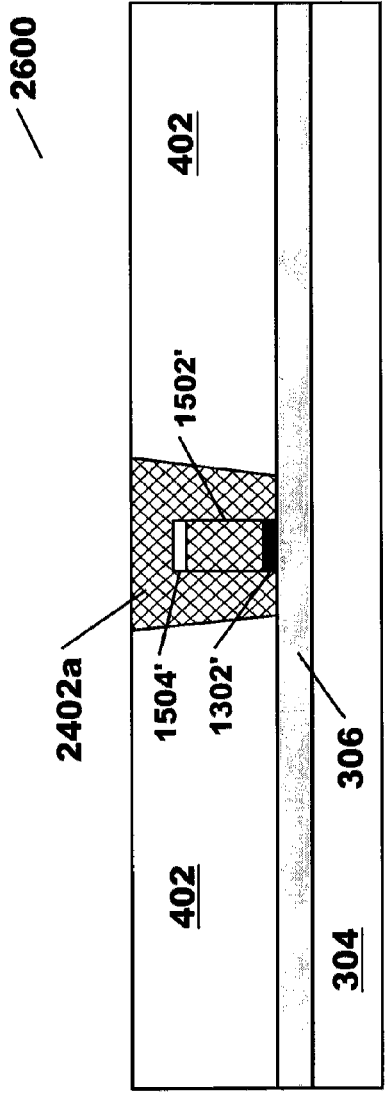
FIG. 26 is a cross section view of FIG. 24 subsequent to planarization in accordance with an embodiment of the present invention.
Figure 27:
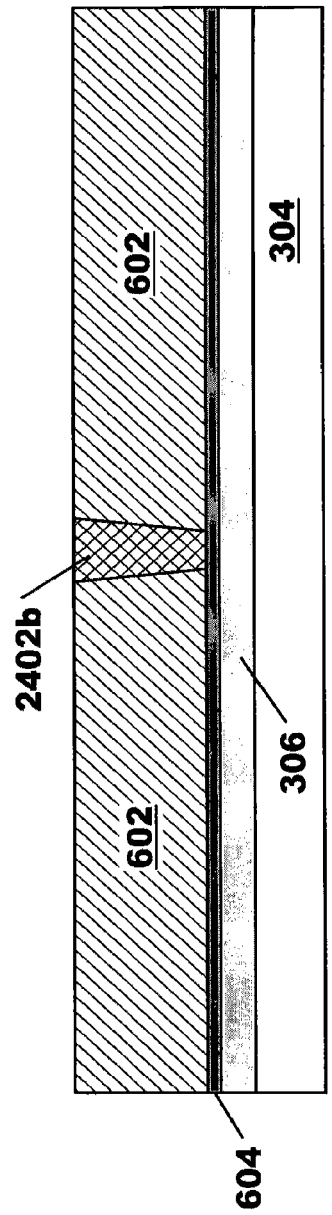
FIG. 27 is a cross section view of FIG. 25 subsequent to planarization in accordance with an embodiment of the present invention.

FIG. 26 is a cross section view 2600 of FIG. 24 subsequent to planarization in accordance with an embodiment of the present invention. The cavity etched in oxide 1 layer 402 contains magnetic material layers 2402a and 1502'. Non-magnetic core layer 1504' is completely imbedded in magnetic material, except for the portions bounded by separation layer 604'. FIG. 27 is a cross section view of FIG. 25 subsequent to planarization. The cavity etched in oxide 2 layer 602 is filled with magnetic layer 2402b.

Figure 28:
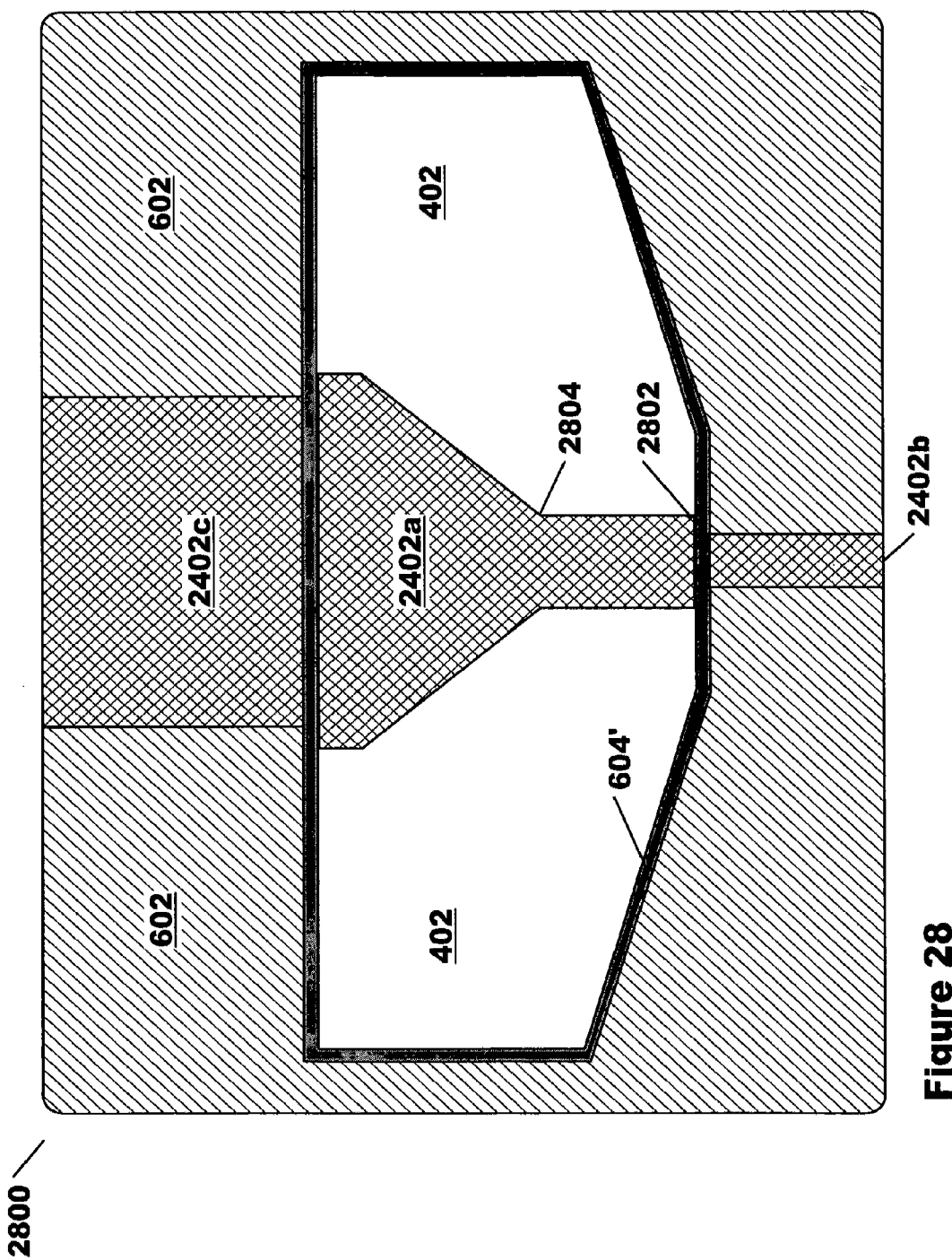
FIG. 28 is a plan view of the structure of FIG. 26, 27 in accordance with an embodiment of the present invention.

FIG. 28 is a plan view 2800 of the structure of FIG. 26, 27 in accordance with an embodiment of the present invention. Several important features of the write pole of the present invention are notable. The pole is divided into three regions; a pole tip region comprising magnetic layer 2402b, a rear pole region, divided from the pole tip region by separation layer 604', and comprising imbedded nonmagnetic layer 1504' and magnetic material layers 1502' and 2402a; and, a third region comprising magnetic material layer 2402c. The rear pole region has two flare points, 2802 and 2804. The first flare point 2802 dominates the performance of the write pole, and is specifically located at the boundary of separation layer 604' and oxide 402. This location is independent of the track width dimension TW' (ref 1102) of the pole tip.

FIGS. 29-38 describe the fabrication of the laterally stepped wrap around shield.

Figure 29:
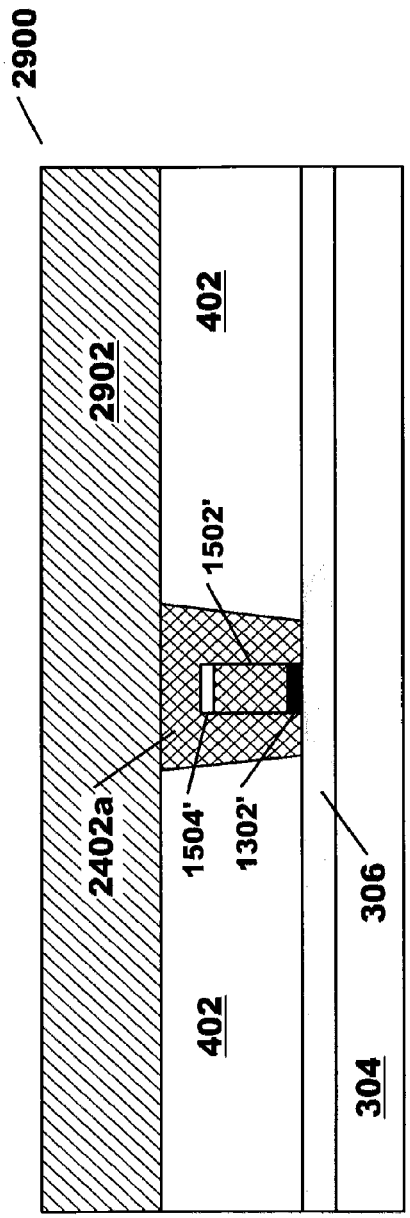
FIG. 29 is a cross section view of FIG. 26 subsequent to the deposition of a second layer of oxide 2 in accordance with an embodiment of the present invention.
Figure 30:
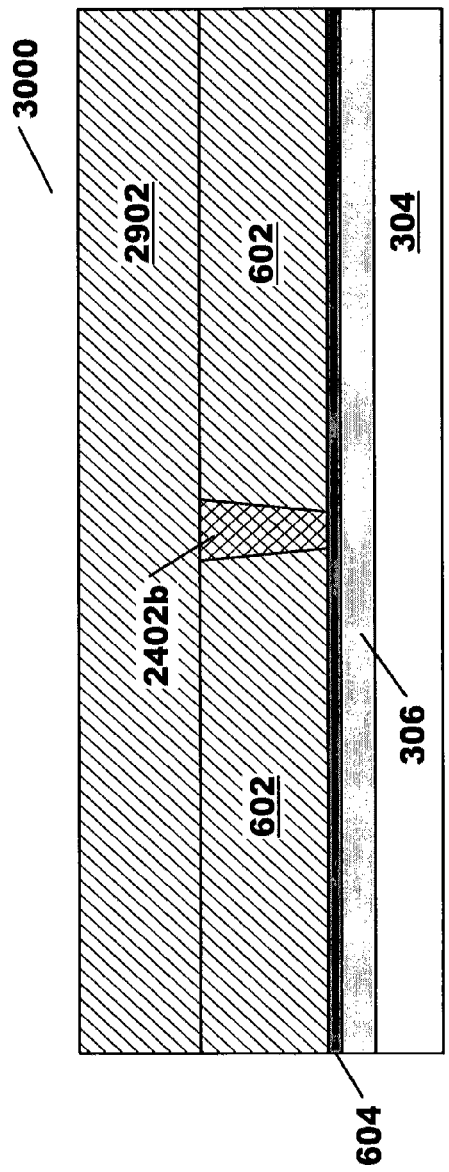
FIG. 30 is a cross section view of FIG. 27 subsequent to the deposition of a second layer of oxide 2 in accordance with an embodiment of the present invention.
Figure 31:
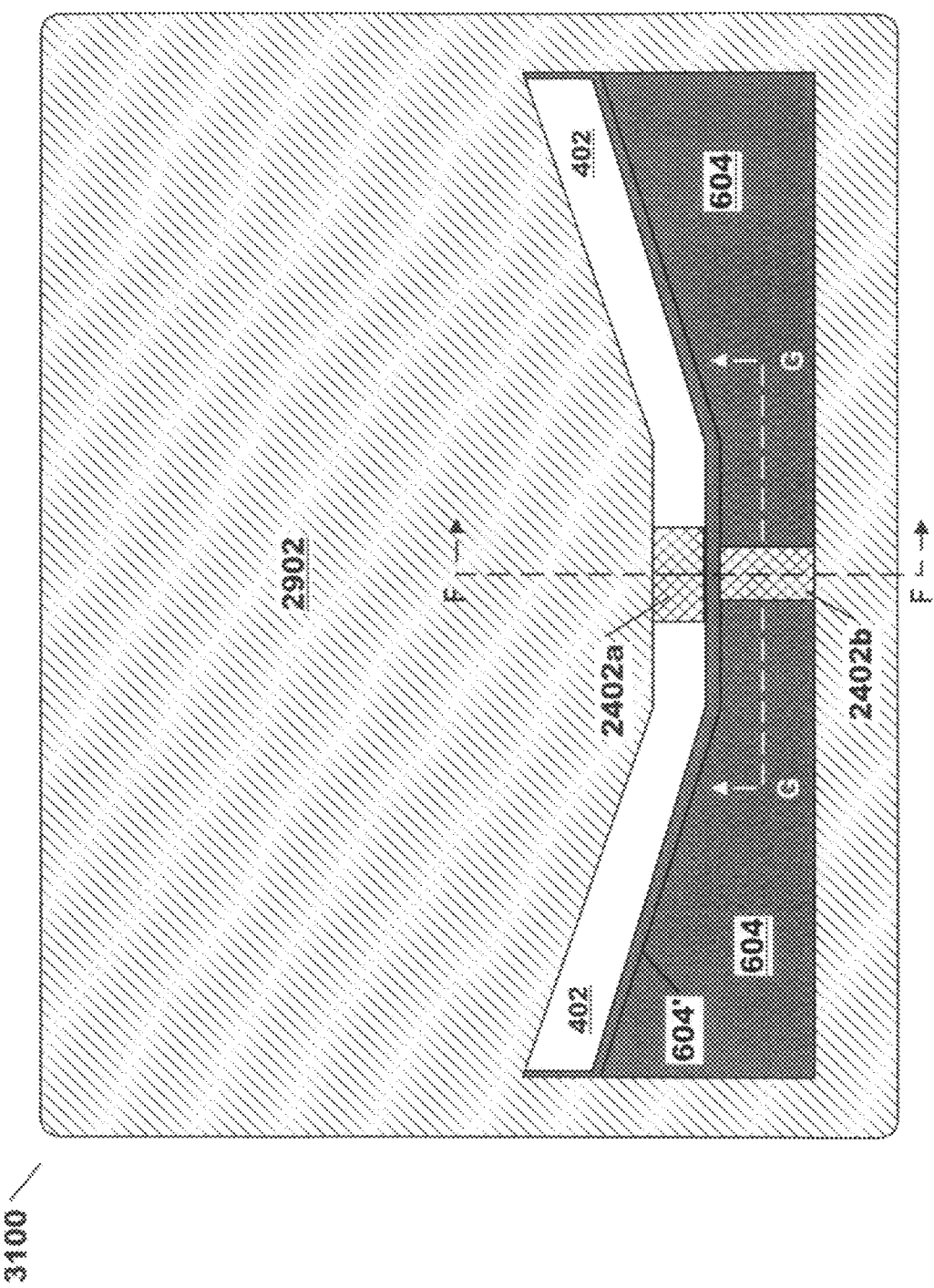
FIG. 31 is a plan view of the structures of FIG. 29, 30 subsequent to the etching of oxide 2 layers in accordance with an embodiment of the present invention.

FIG. 29 is a cross section view 2900 of FIG. 26 subsequent to the deposition of a second layer 2902 of oxide 2 in accordance with an embodiment of the present invention. FIG. 30 is a cross section view 3000 of FIG. 27 subsequent to the deposition of oxide layer 2902. Following deposition of oxide layer 2902, a blanket RIE mask layer is deposited and patterned in accordance with processes known in the art (not shown). Portions of oxide 2 layer 2902 and 602 are then removed by a selective RIE process designed to remove oxide 2 without etching oxide 1 layer 402, as disclosed above. FIG. 31 is a plan view 3100 of the structures of FIG. 29, 30 subsequent to the selective etching of oxide 2 layers 2902 and 602 in accordance with an embodiment of the present invention.

Figure 32:
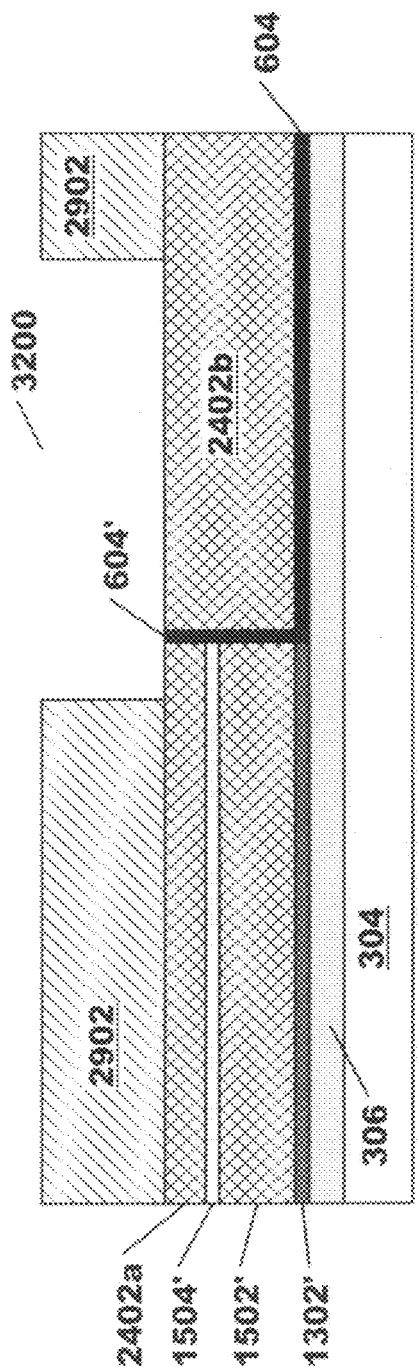
FIG. 32 is a cross section view through section F-F in FIG. 31 in accordance with an embodiment of the present invention.
Figure 33:
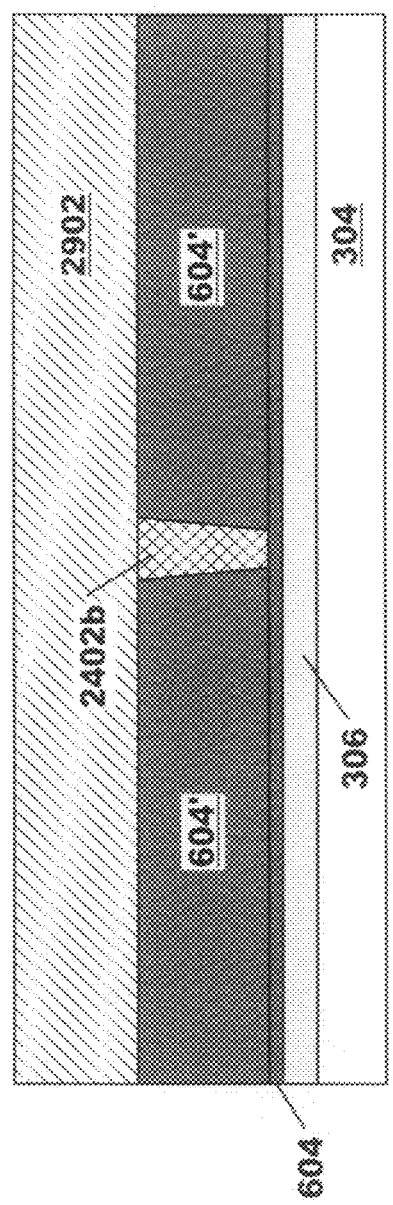
FIG. 33 is a cross section view through section G-G in FIG. 31 in accordance with an embodiment of the present invention.
Figure 34A:
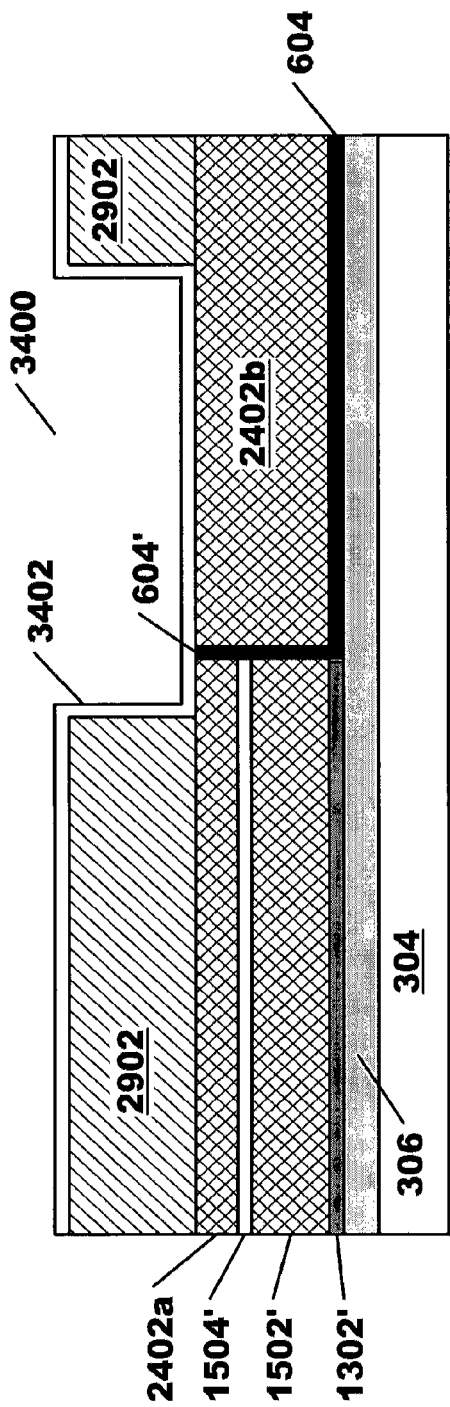
FIG. 34a is a cross section view of FIG. 32 subsequent to the deposition of a side gap layer in accordance with an embodiment of the present invention.
Figure 35A:
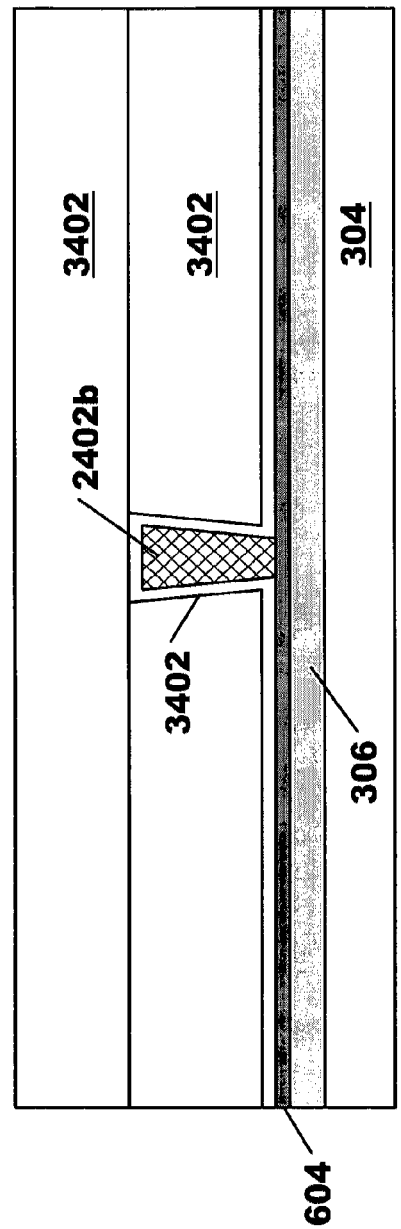
FIG. 35a is a cross section view of FIG. 33 subsequent to the deposition of a side gap layer in accordance with an embodiment of the present invention.
Figure 34B:
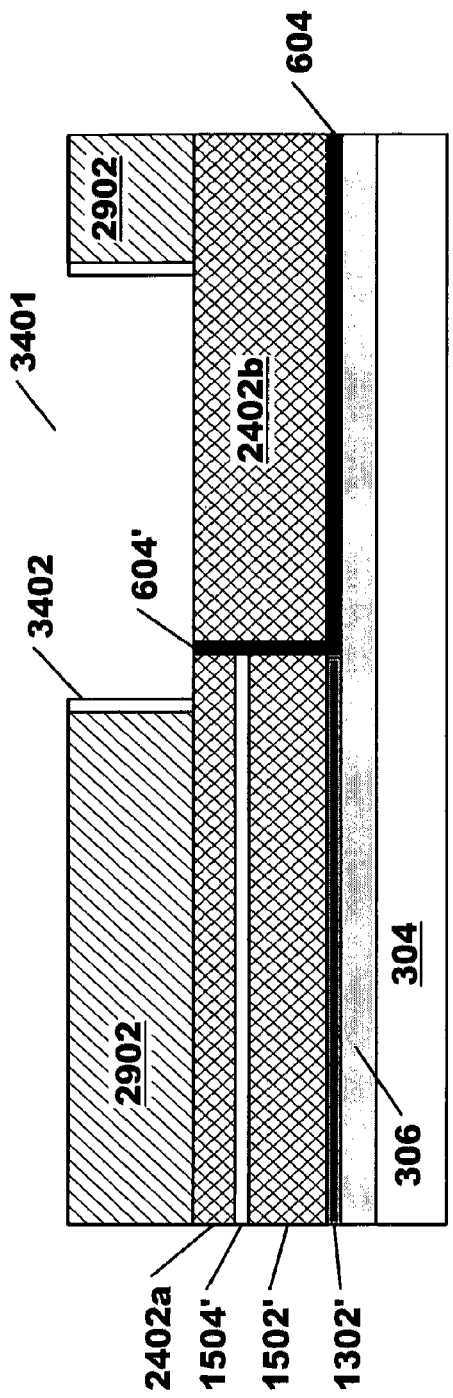
FIG. 34b is a cross section view of FIG. 34a subsequent to the removal of portions of side gap layer 3402 in accordance with an embodiment of the present invention.
Figure 35B:
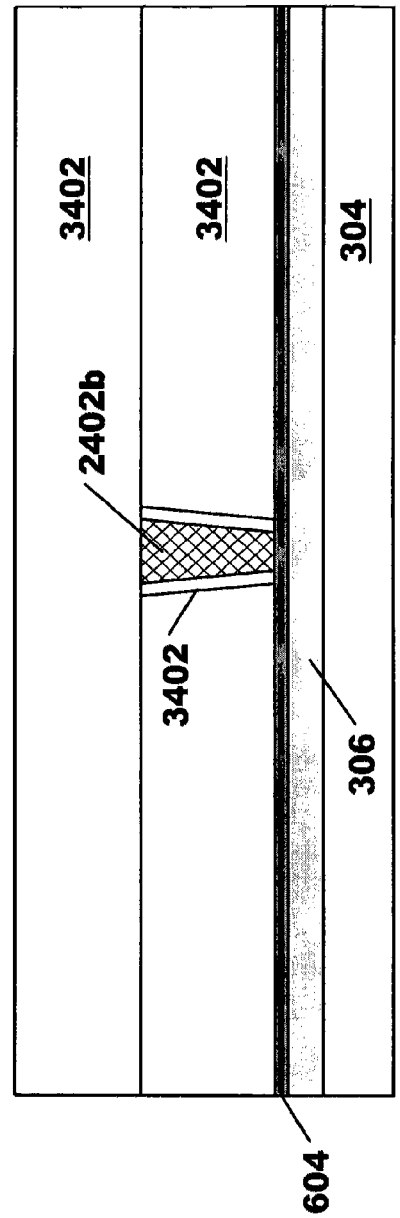
FIG. 35b is a cross section view of FIG. 34a subsequent to the removal of portions of side gap layer 3402 in accordance with an embodiment of the present invention.

FIG. 32 is a cross section view 3200 through section F-F in FIG. 31. FIG. 33 is a cross section view 3300 through section G-G in FIG. 31. FIG. 34a is a cross section view 3400 of FIG. 32 subsequent to the deposition of a side gap layer 3402 in accordance with an embodiment of the present invention. FIG. 35a is a cross section view 3500 of FIG. 33 subsequent to the deposition of a side gap layer 3402. Side gap layer 3402 preferably comprises alumina, but also comprise a non-magnetic metal such as Rh, or Ru. Side gap layer 3402 is deposited by atomic layer deposition, ALD, to provide conformal coverage on all exposed surfaces. The processes involved in ALD are known to those skilled in the art. FIG. 34b is a cross section view 3401 of FIG. 34a subsequent to the removal of portions of side gap layer 3402 in accordance with an embodiment of the present invention. FIG. 35b is a cross section view 3501 of FIG. 34a subsequent to the etching of portions of side gap layer 3402. Typically, removal of side gap layer 3402 on horizontal surfaces (as viewed in FIGS. 34a, 35a) is performed by ion milling, in accordance with processes well known in the art.

Figure 38:
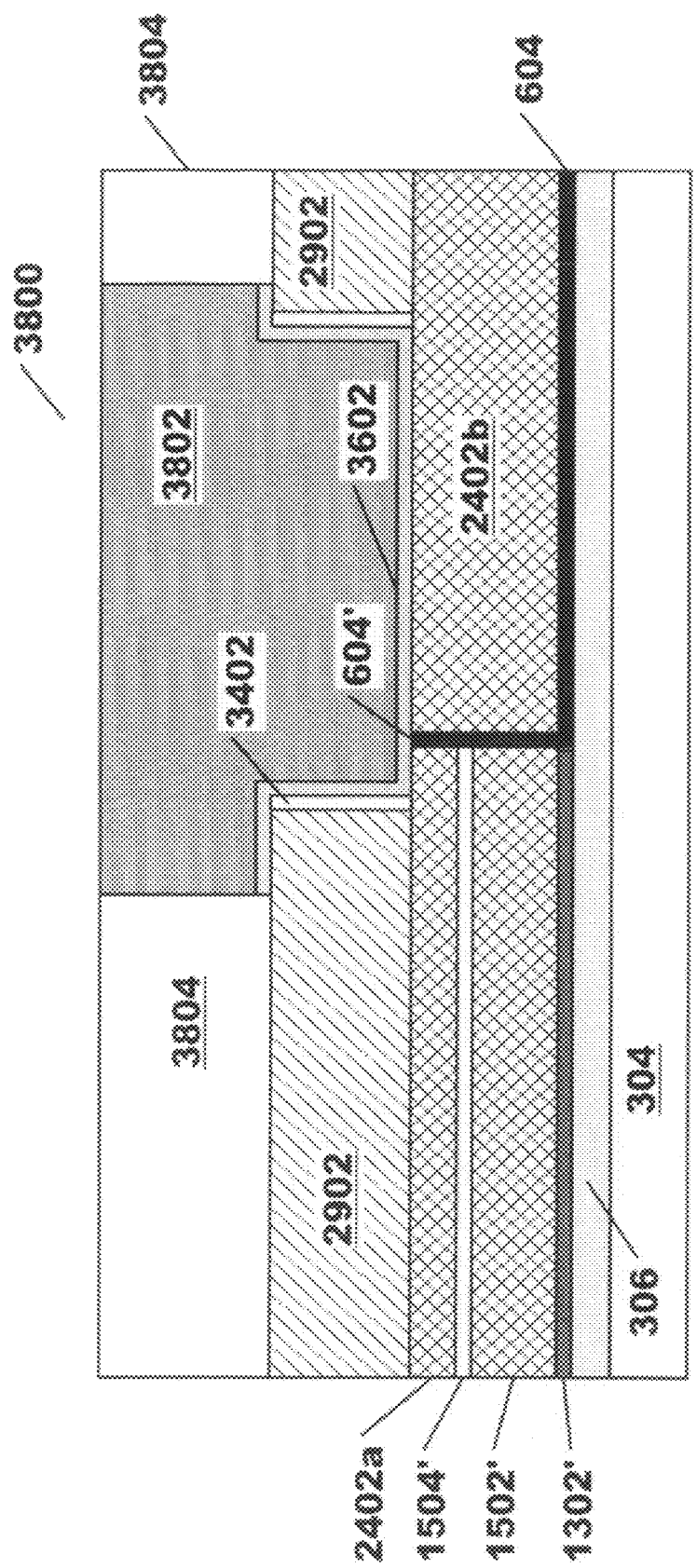
FIG. 38 is a cross section view of FIG. 36 subsequent to shield deposition in accordance with an embodiment of the present invention.
Figure 39:
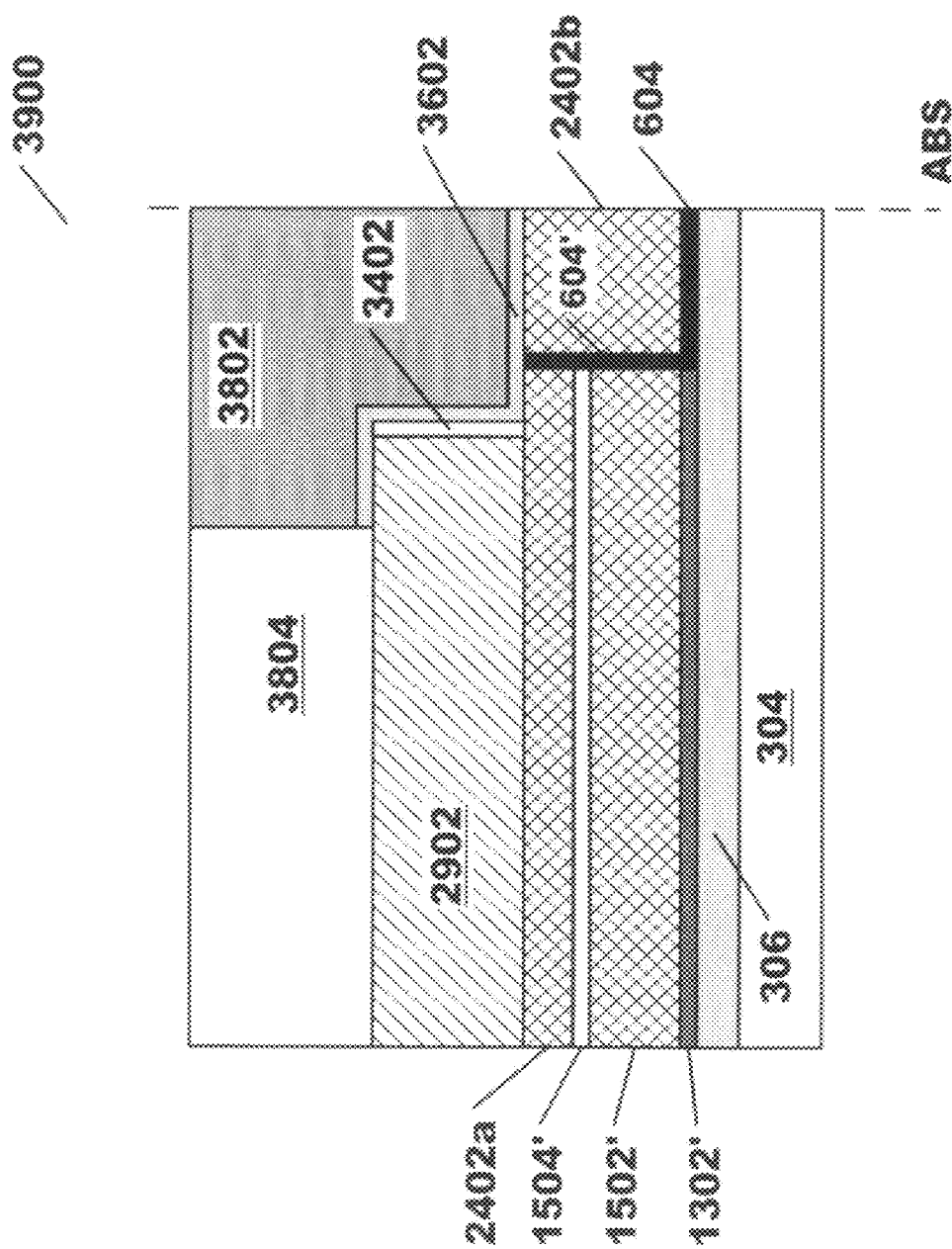
FIG. 39 is a cross section view of FIG. 38 subsequent to lapping in accordance with an embodiment of the present invention.

FIG. 36 is a cross section view 3600 of FIG. 34b subsequent to the blanket deposition of shield gap layer 3602 in accordance with an embodiment of the present invention. FIG. 37 is a cross section view of FIG. 35b subsequent to the deposition of shield gap layer 3602. Shield gap layer 3602 is deposited by ALD, in accordance with processes well known in the art. Shield gap layer may comprise a metal such as Rh, Ru, Pd, Pt; or a dual layer comprising a first layer of an oxide such as alumina, covered in a seed layer of magnetic material such as alloys of Ni, Fe, and Cr (not shown). In any case, the upper exposed layer must be conductive to facilitate electroplating of the shield. Following the deposition of gap layer 3602, a photo resist layer is deposited, imaged, and developed (not shown) to provide a boundary for the shield during electroplating. After electroplating, the photo resist layer is removed, along with a portion of gap layer 3602 (not shown). A blanket oxide layer is then deposited and planarized by CMP (not shown). FIG. 38 is a cross section view 3800 of FIG. 36 subsequent to shield 3802 deposition, filler oxide 3804 deposition, and planarization, in accordance with an embodiment of the present invention. The structure is then lapped to form the air bearing surface (ABS). FIG. 39 is a cross section view 3900 of FIG. 38 subsequent to lapping in accordance with an embodiment of the present invention. Lapping determines the throat height of the shield, which is the length of the forward pole layer 2402b between the ABS and the vertical boundary with separation layer 604', less the thickness of the two added layers 3402 and 3602 (not shown). See the plan view of FIG. 31 and process steps shown in FIGS. 34a-37. FIG. 39 also shows the rear pole comprising magnetic layers 1502', 2402a, and imbedded nonmagnetic layer 1504'.

Figure 40:
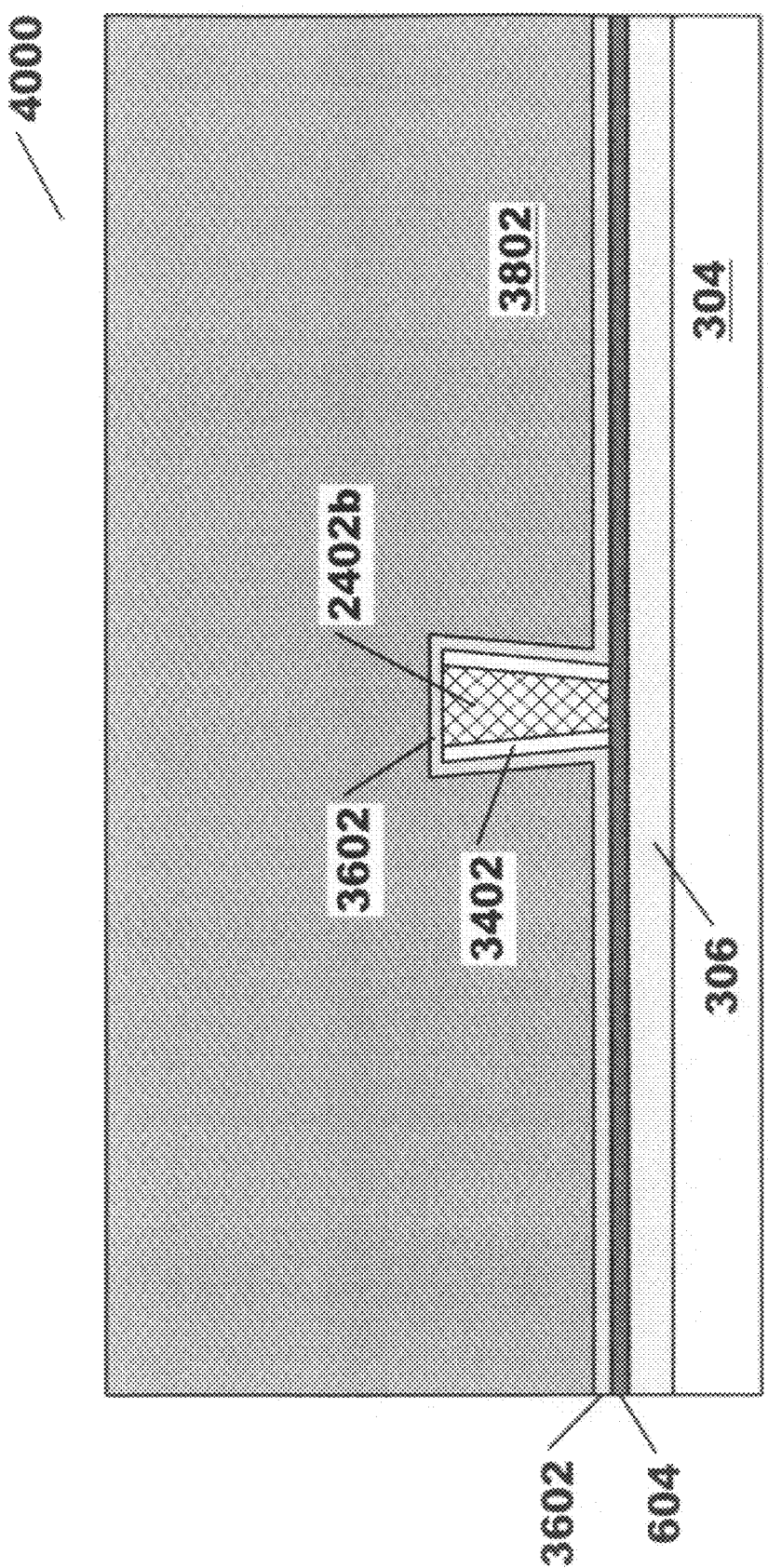
FIG. 40 is an ABS view of the structure of FIG. 39 in accordance with an embodiment of the present invention; and, FIG. 41 is a plan view of the structure of FIG. 39 in accordance with an embodiment of the present invention.
Figure 41:
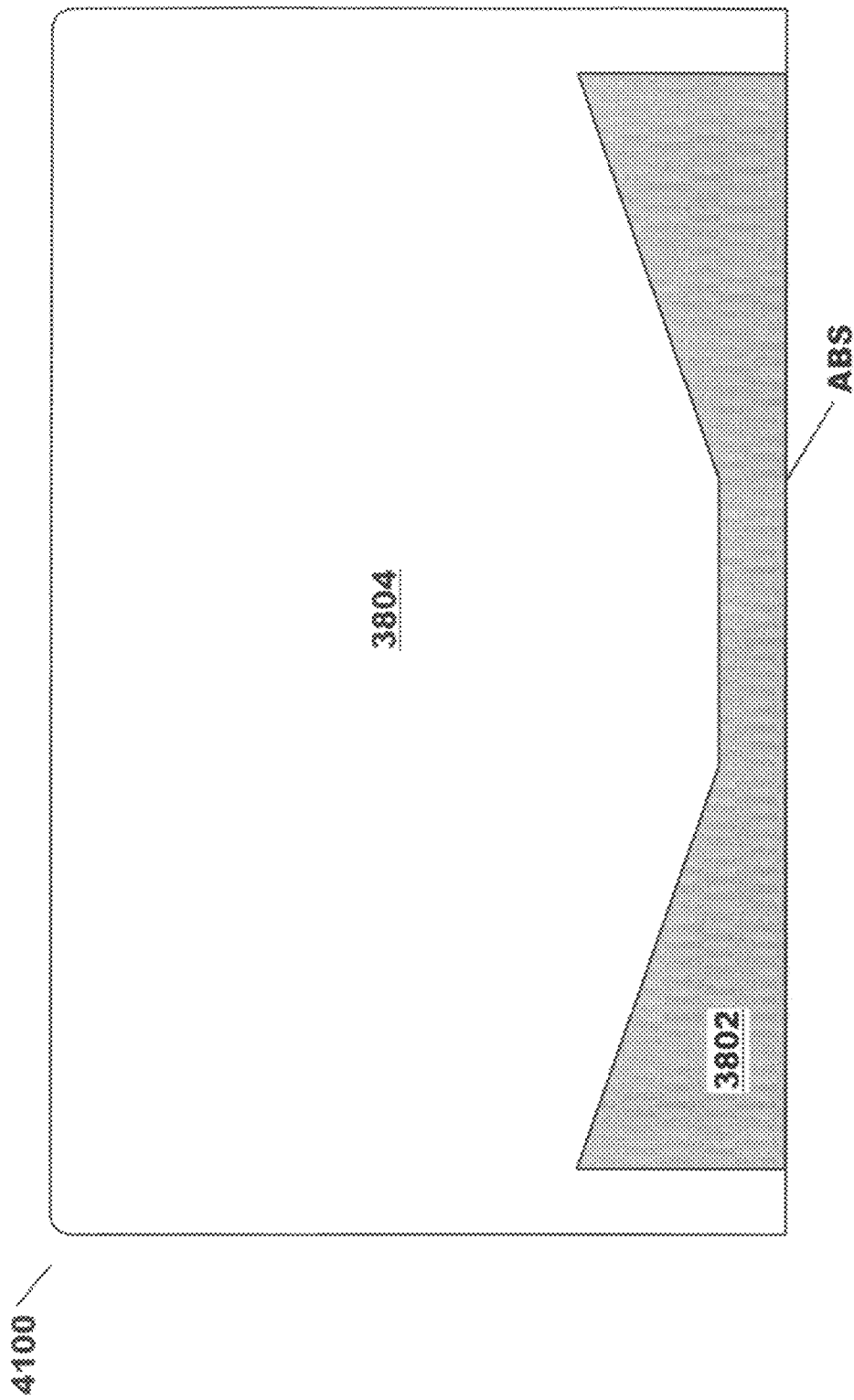

FIG. 40 is an ABS view 4000 of the structure of FIG. 39 in accordance with an embodiment of the present invention. FIG. 41 is a plan view 4100 of the structure of FIG. 39 in accordance with an embodiment of the present invention.

The foregoing features described in embodiments of the present invention provide for a number of advantages in the write performance. The rear pole (yoke) having embedded non-magnetic core layer 1504' promotes a transverse closure domain under small driving magnetic fields, therefore minimizing the effect of any remnant field. It also enables fast field response to the driving field through a magnetization rotation mechanism. De-coupling the pole tip from the rear pole (via separation layer 604') leads to an independent relaxation process inducing more instantaneous head field relaxation after writing, essential for magnetic recording data rates over 1 GHz.

The present invention is not limited by the previous embodiments heretofore described. Rather, the scope of the present invention is to be defined by these descriptions taken together with the attached claims and their equivalents.

What is claimed is:

1. A thin film perpendicular magnetic head comprising
   a write pole having a first flare point, a second flare point, and a separation layer,
   said write pole having a first portion extending from an air bearing surface to said separation layer, said first portion having a constant first width,
   said write pole having a second portion extending from said first flare point to said second flare point, said second portion having a constant second width greater than said first width, said separation layer dividing said first portion from said second portion.

2. The magnetic head as recited in claim 1 wherein said write pole has a third portion extending from said second flare point in a direction away from said air bearing surface, said third portion having a width that increases linearly in proportion to a distance from said second flare point.

3. The magnetic head as recited in claim 1, wherein said first width is approximately equal to a track width of said write pole.

4. The magnetic head as recited in claim 3, wherein said second width is less than or equal to said track width plus dimension 2D.

5. The magnetic head as recited in claim 2, wherein said second and said third portions of said write pole comprise an embedded, non-magnetic core layer, wherein a width of said non-magnetic core layer is less than the width of said second and said third portions of said write pole.

6. The magnetic head as recited in claim 1, further comprising a stepped shield structure having
   a throat height,
   a first portion, immediately above said write pole, having a first depth, as measured from the air bearing surface,
   a second portion, immediately above said first portion, having a second depth, as measured from the air bearing surface,
   wherein, said first depth is greater than said throat height, and said second depth is greater than said first depth.

* * * * *